US012785851B2

(12) United States Patent
Min et al.

(10) Patent No.: US 12,785,851 B2
(45) Date of Patent: Nov. 3, 2026

(54) TRANSMITTER AND TRANSCEIVER WITH SWITCHING JITTER IMPROVEMENT

(71) Applicant: SAMSUNG ELECTRONICS CO., LTD., Suwon-si (KR)

(72) Inventors: Kyunghwan Min, Suwon-si (KR); Jahoon Jin, Suwon-si (KR); Sangho Kim, Suwon-si (KR); Jisu Yook, Suwon-si (KR); Soomin Lee, Suwon-si (KR); Jihoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 18/788,699

(22) Filed: Jul. 30, 2024

(65) Prior Publication Data

US 2025/0070914 A1 Feb. 27, 2025

(30) Foreign Application Priority Data

Aug. 22, 2023 (KR) ........................ 10-2023-0110072
Jan. 10, 2024 (KR) ........................ 10-2024-0004487

(51) Int. Cl.
*H03C 1/52* (2006.01)
*H04L 1/00* (2006.01)
*H04L 25/03* (2006.01)

(52) U.S. Cl.
CPC .......... *H04L 1/0042* (2013.01); *H04L 1/0047* (2013.01); *H04L 1/0056* (2013.01);
(Continued)

(58) Field of Classification Search
CPC ... H04L 1/0042; H04L 1/0047; H04L 1/0056; H04L 25/03006; H04L 2025/03363; H04L 25/4917; H03M 7/165
(Continued)

(56) References Cited

U.S. PATENT DOCUMENTS 7,308,048 B2 12/2007 Wei
9,819,523 B2 11/2017 Lee et al.
(Continued)

FOREIGN PATENT DOCUMENTS

EP 3214554 A1 9/2017

OTHER PUBLICATIONS

Zheng, et al., "A 50-112-Gb/s PAM-4 Transmitter With a Fractional-Spaced FFE in 65-nm CMOS", IEEE Journal of Solid-State Circuits, vol. 55, No. 7, Jul. 2020, pp. 1864-1876.
(Continued)

*Primary Examiner* — Helene E Tayong
(74) *Attorney, Agent, or Firm* — Morgan, Lewis & Bockius LLP

(57) ABSTRACT

Disclosed are a transmitter and transceiver for improving switching jitter. The transmitter includes an encoder that encodes an input signal representable by x levels (where x is a natural number of 3 or more) and outputs a plurality of encoded signals representing a multi-bit binary number including a most significant bit and a least significant bit; an edge adjustment circuit that generates a plurality of adjusted encoded signals by adjusting a falling edge timing of a first one of the encoded signals corresponding to the most significant bit and adjusting a rising edge timing of a second one of the encoded signals corresponding to the least significant bit; and a driver circuit that generates and outputs an output signal having the x levels based on the adjusted encoded signals.

20 Claims, 15 Drawing Sheets

(52) U.S. Cl.
CPC .................. *H04L 25/03006* (2013.01); *H04L 2025/03363* (2013.01)

(58) Field of Classification Search
USPC .......................................................... 375/300
See application file for complete search history.

(56) References Cited

U.S. PATENT DOCUMENTS

| | | | |
|---|---|---|---|
| 10,148,414 B2 | 12/2018 | Lugthart et al. | |
| 10,491,238 B2 | 11/2019 | Sudhakaran et al. | |
| 10,530,617 B2 | 1/2020 | Lin | |
| 10,560,146 B2 | 2/2020 | Ulrich et al. | |
| 12,347,508 B2 * | 7/2025 | Sudhakaran ........... | G11C 29/42 |
| 2014/0036988 A1 * | 2/2014 | Kashima ............. | H04L 25/4902<br>375/238 |
| 2021/0367749 A1 | 11/2021 | Lee et al. | |
| 2022/0059156 A1 | 2/2022 | Park et al. | |
| 2023/0116188 A1 | 4/2023 | Rie et al. | |
| 2023/0171134 A1 | 6/2023 | Jin et al. | |

OTHER PUBLICATIONS

EPO Search Report dated Jan. 30, 2025 in corresponding European Patent Application No. 24194952.8, 13 pages.
Jin, et al., "A 4nm 16Gb/s/pin Single-Ended PAM4 parallel Transceiver with Switching-Jitter Compensation and Transmitter Optimization", ISSCC 2023, Session 28, High-Density Memories and High-Speed Interface, 28.3, 5 pages.

* cited by examiner

FIG. 3

| IS | | Encoding signal | | |
|---|---|---|---|---|
| MSB | LSB | ES1 | ES2 | ES3 |
| 0 | 0 | 0 | 0 | 0 |
| 0 | 1 | 0 | 0 | 1 |
| 1 | 0 | 0 | 1 | 1 |
| 1 | 1 | 1 | 1 | 1 |

TRANSMITTER AND TRANSCEIVER WITH SWITCHING JITTER IMPROVEMENT

CROSS-REFERENCE TO RELATED APPLICATIONS

This application claims priority under 35 U.S.C. § 119 to Korean Patent Application No. 10-2023-0110072 filed on Aug. 22, 2023 and Korean Patent Application No. 10-2024-0004487 filed on Jan. 10, 2024, in the Korean Intellectual Property Office, the disclosures of which are incorporated by reference herein in their entireties.

TECHNICAL FIELD

Embodiments of the present disclosure described herein relate to a transmitter and transceiver with improved switching jitter.

DISCUSSION OF RELATED ART

Multi-level signaling such as pulse amplitude modulation (PAM)-x allows more information to be transmitted in the same data cycle. For instance, in a PAM-4 scheme, four voltage levels are used to represent two bits of information, where each level represents a different combination of the two bits. With PAM-3 signaling, three distinct levels are used to encode information: minus one, zero, and plus one.

The multi-level signaling may be used in or between various semiconductor devices and interfaces to overcome the bottleneck of input/output bandwidth. However, as the number of levels in the multi-level signaling increases, the number of transitions between levels also increases, so switching jitter may increase and horizontal eye opening and timing margin may decrease.

SUMMARY

Embodiments of the present disclosure provide a transmitter and transceiver with improved switching jitter.

According to an embodiment, a transmitter includes an encoder that encodes an input signal representable by x levels (where x is a natural number of 3 or more) and outputs a plurality of encoded signals representing a multi-bit binary number including a most significant bit and a least significant bit; an edge adjustment circuit that generates a plurality of adjusted encoded signals by adjusting a falling edge timing of a first one of the encoded signals corresponding to a most significant bit, and adjusting a rising edge timing of a second one of the encoded signals corresponding to the least significant bit; and a driver circuit that outputs an output signal having the x levels, based on the plurality of adjusted encoded signals.

According to an embodiment, a transmitter includes an encoder that encodes an input signal representing x levels (where x is a natural number of 3 or more) and outputs a plurality of encoded signals representing a multi-bit binary number including a most significant bit, a middle bit, and a lowest significant bit; an edge adjustment circuit that generates a plurality of adjusted encoded signals by adjusting a falling edge timing of a first one of the encoded signals corresponding to the most significant bit and a rising edge timing of a second one of the encoded signals corresponding to the least significant bit by a first adjustment timing value, and adjusting edge timing of a third one of the encoded signals corresponding to the middle bit by a second, different adjustment timing value; and a driver circuit that generates an output signal having the x levels based on the adjusted encoded signals.

According to an embodiment, a data communication system includes a transmitter that outputs an output signal having x levels based on adjusting falling edge timing of an encoded signal corresponding to a most significant bit and rising edge timing of an encoded signal corresponding to a least significant bit among bits of a multi-bit binary number represented by a plurality of encoded signals encoded from an input signal represented by the x levels (where x is a natural number of 3 or more); and a receiver connected to the transmitter through a channel to receive the output signal and obtain the input signal from the output signal.

According to an embodiment, a transmitter includes: an encoder configured to encode an input signal comprising a bit sequence of successive j-bit binary numbers, to provide k encoded signals representing successive k-bit binary numbers, each corresponding to one of the j-bit binary numbers. Each k-bit binary number includes a most significant bit and a least significant bit. k and j are each integers, j is at least two, k is at least three and is greater than j. The transmitter further includes an edge adjustment circuit configured to generate a plurality of adjusted encoded signals by adjusting a falling edge timing of a first one of the k encoded signals corresponding to the most significant bit, and adjusting a rising edge timing of a second one of the encoded signals corresponding to the least significant bit; and a driver circuit configured to combine the k adjusted encoded signals to generate and output an output signal having x levels, where x is an integer of at least three, each of the x levels representing one respective value of the j-bit binary numbers.

According to the present disclosure, it is possible to provide a transmitter and transceiver for improving switching jitter.

BRIEF DESCRIPTION OF THE FIGURES

The above and other aspects and features of the present disclosure will become apparent by describing in detail embodiments thereof with reference to the accompanying drawings.

FIG. 3 illustrates a truth table between the input signal and the encoded signal of FIG. 2;

DETAILED DESCRIPTION

Hereinafter, embodiments of the present disclosure will be described clearly and in detail so that those skilled in the art can easily carry out embodiments of the present disclosure.

Herein, terminology such as a "(M-N)th transition" may refer to a transition from an Mth level to an Nth level. For instance, a (1-4)-th transition may be a transition from a level 1 to a level 4.

Figure 1:
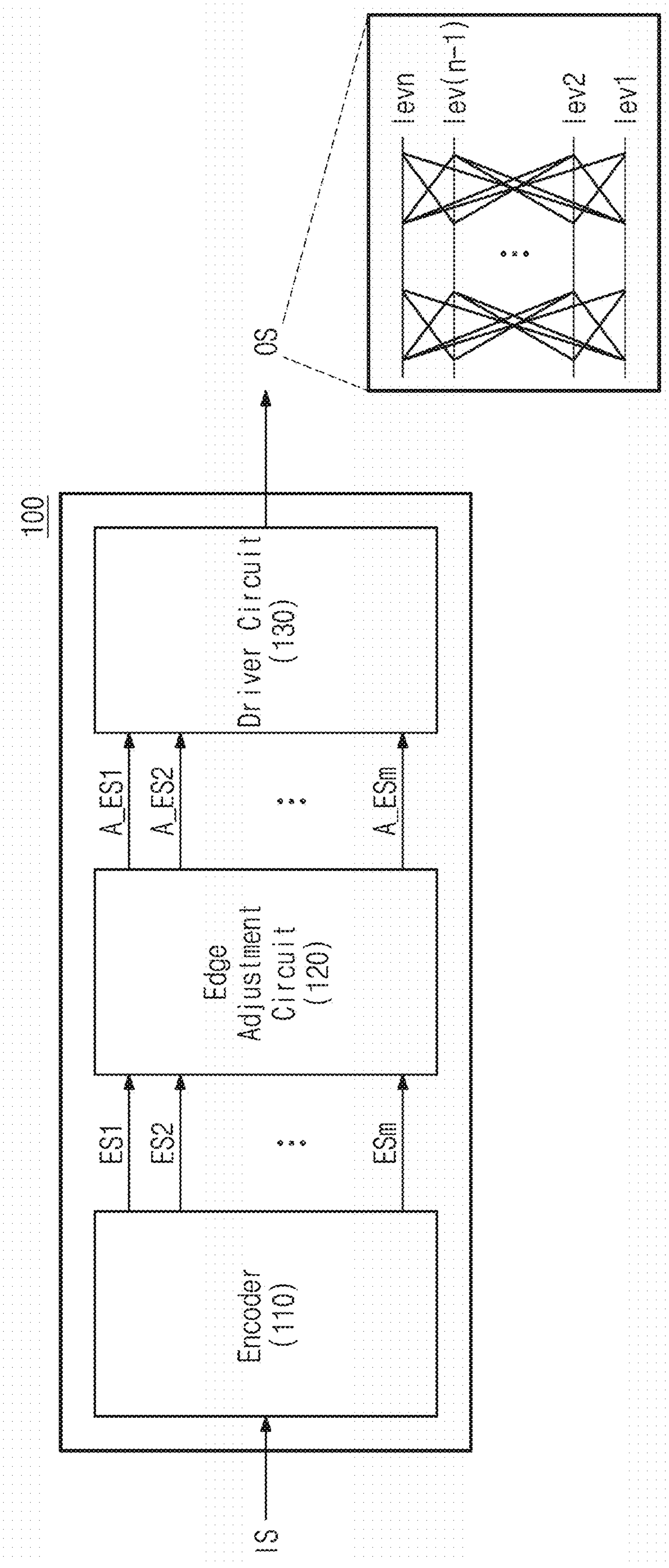
FIG. 1 illustrates a transmitter according to an embodiment.

FIG. 1 illustrates a transmitter according to an embodiment.

Referring to FIG. 1, a transmitter 100 may be configured to receive an input signal IS, process the received input signal IS, and transmit it to a receiver. The transmitter 100 may be connected to the receiver through a channel. The transmitter 100 may be applied to various interface/memory standards that support multi-level signaling. The transmitter 100 may perform multi-level signaling on the input signal IS and output an output signal OS having a multi-level. Hereafter, the multi-level signaling will not refer to a 2-bit signaling scheme such as non-return to zero (NRZ), but a signaling scheme in which at least the signal level x (where x is a natural number of 3 or more) is 3 or higher, such as pulse amplitude modulation-3 (PAM-3), PAM-4, and higher levels.

For example, the transmitter 100 may support channel interface standards such as peripheral component interconnection express (PCIe), PCIe generation (Gen) 6.0, and the like, or memory standards such as graphics double data rate (GDDR), GDDR6X, low power double data rate (LPDDR), LPDDR6, double data rate (DDR), DDR6, and the like, or may be configured to transmit a signal with multi-level according to the protocol of the above-mentioned channel interface standard or the memory standard.

In the present disclosure, the input signal IS input to the transmitter 100 may be a digital signal or a symbol of n bits (where n is a natural number of 2 or more). In some cases, 'x', which is a level of the output signal OS, may be $2^n$. The input signal IS may be a digital signal or a symbol representable by x levels. In this case, each combination of n bits of the input signal IS may represent one of x levels. In other words, it may be understood that the input signal IS is ultimately represented by x levels. For example, when the input signal IS is 2 bits and multi-level signaling is a PAM scheme, the output signal OS, which is a PAM-4 signal, may have four levels. In the case of PAM-3, three distinct levels are used to encode information: minus one, zero, and plus one. A receiver may use high and low thresholds to determine the PAM-3 levels. Samples above the high level are plus one; samples below the low level are minus one, and samples between the two levels are zero.

The transmitter 100 according to an embodiment may include an encoder 110, an edge adjustment circuit 120, and a driver circuit 130.

The encoder 110 may be configured to encode the input signal IS representing x levels and output a plurality of encoded signals ES1 to ESm. In this case, the number of the plurality of encoded signals ES1 to ESm may be m (where m is a natural number). That is, each encoded signal ES1 to ESm may correspond to one bit of a multi-bit binary number. Each combination of m bits of the encoded signals ES1 to ESm may represent one of x levels, and correspond to a certain bit-sequence of the input signal IS.

According to an embodiment, the encoder 110 may encode the input signal IS in a thermometer coding scheme to reduce mismatch of the driver circuit 130 connected to the output terminal of the encoder 110. In this case, the plurality of encoded signals ES1 to ESm may be thermometer codes. The size of the thermometer code may be set such that the size of the unit impedance being pulled up or pulled down is implemented to be the same when the driver circuit 130 performs a pull-up or pull-down operation to output a multi-level output signal OS. Accordingly, mismatch of the driver circuit 130 may be reduced as the thermometer code is used.

According to an embodiment, when the encoder 110 performs encoding according to the thermometer coding scheme, the plurality of encoded signals ES1 to ESm may have a size of $2^n-1$ bits. Thus, the plurality of encoded signals ES1 to ESm may have a size of x−1 bits.

The edge adjustment circuit 120 may be connected between the output terminal of the encoder 110 and the input terminal of the driver circuit 130. The edge adjustment circuit 120 may be configured to receive the plurality of encoded signals ES1 to ESm from the encoder 110 and adjust the edge timing of at least some of the plurality of encoded signals ES1 to ESm. Hence, the edge adjustment circuit 120 may independently adjust the edge timing of each of encoded signals ES1 to ESm. The edge adjustment circuit 120 may adjust the switching timing of the output signal OS by adjusting the edge timing. As the switching timing of the output signal OS is adjusted, the switching jitter of the eye diagram represented by the output signal OS may be adjusted.

According to an embodiment, the edge adjustment circuit 120 may output a plurality of adjusted encoded signals A_ES1 to A_ESm by adjusting the falling edge timing of the encoded signal ES1 corresponding to the most significant bit and the rising edge timing of the encoded signal ESm corresponding to the least significant bit among the plurality of encoded signals ES1 to ESm. In detail, the edge adjustment circuit 120 may adjust the falling edge timing of the encoded signal ES1 corresponding to the most significant bit and the rising edge timing of the encoded signal ESm corresponding to the least significant bit back by the adjustment timing value in the time domain. The adjustment timing value may be applied equally to the falling edge timing and the rising edge timing.

According to an embodiment, the adjustment timing value may be set to a value at which the switching jitter of the mid eye is reduced compared to that before adjustment in the eye diagram represented by the output signal OS. The edge adjustment circuit 120 may reduce the switching jitter of the mid eye of the eye diagram by adjusting each edge timing back by the adjustment timing value.

The falling edge timing of the encoded signal ES1 may include timings at which the plurality of encoded signals ES1 to ESm transition from the highest level among the x levels to the remaining levels. In addition, the rising edge timing of the encoded signal ESm may include timings at which the plurality of encoded signals ES1 to ESm transition from the lowest level among the x levels to the remaining levels. In this case, among the rising edge timings and falling edge timings, the timing of transition to a level close to the mid eye may have a relatively large influence on the switching jitter of the mid eye.

The edge adjustment circuit 120 may effectively reduce the switching jitter of the mid-eye by adjusting the timing that has a large influence on the switching jitter of the mid-eye by adjusting the falling edge timing and the rising edge timing.

The driver circuit 130 may receive the plurality of adjusted encoded signals A_ES1 to A_ESm whose edge timings are adjusted from the edge adjustment circuit 120, and may output the plurality of adjusted encoded signals A_ES1 to A_ESm as the output signal OS having x levels. According to an embodiment, the driver circuit 130 may perform the above-described pull-up and pull-down operations based on the plurality of adjusted encoded signals A_ES1 to A_ESm. Through the pull-up and pull-down operations, the output signal OS having x levels may be output from the driver circuit 130.

For example, the driver circuit 130 may include a plurality of pull-up transistors that are turned on or off according to the plurality of adjusted encoded signals A_ES1 to A_ESm, and a plurality of pull-down transistors that operate complementary to the plurality of first transistors. As each transistor is turned on or off, the impedance of the driver circuit 130 may change and the output signal OS having one of x levels may be output according to the changed impedance.

For example, the voltage level of the output signal OS of the driver circuit 130 may be determined through voltage distribution of the resistor according to the pull-up and pull-down operations of the driver circuit 130. The output timing may be determined based on the timing of the plurality of adjusted encoded signals A_ES1 to A_ESm.

According to the above-described embodiments, the transmitter 100 may include the edge adjustment circuit 120 between the encoder 110 and the driver circuit 130, and may reduce the switching jitter of the mid-eye of the output signal OS through the edge adjustment circuit 120. Specifically, the transmitter 100 may effectively reduce the switching jitter of the mid eye by adjusting the falling edge timing of the encoded signal ES1 corresponding to the most significant bit and the rising edge timing of the encoded signal ESm corresponding to the least significant bit.

Figure 2:
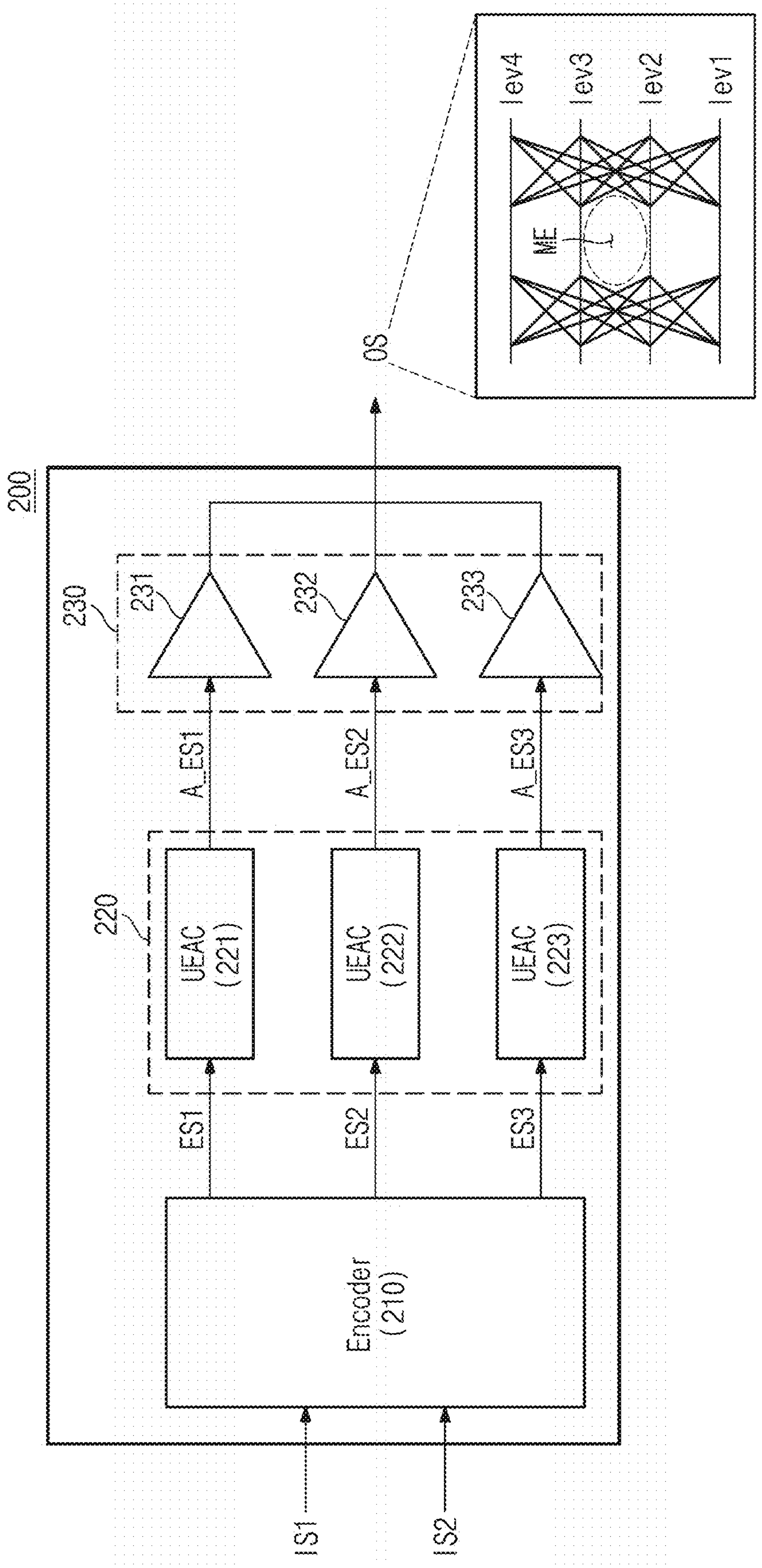
FIG. 2 illustrates a PAM-4 based transmitter according to an embodiment.

FIG. 2 illustrates a PAM-4 based transmitter according to an embodiment.

Referring to FIG. 2, a transmitter 200 according to an embodiment may be configured to transmit the output signal OS based on PAM-4, so that n=2 and x=4. Accordingly, the input signal may have a size of 2 bits, and the plurality of encoded signals ES1 to ES3 may have a size of 3 bits.

An encoder 210 may receive a 2-bit input signal and encode the input signal into a 3-bit encoded signal (interchangeably called 3 encoded signals). In this case, the input signal may include a first input signal IS1 corresponding to the most significant bit (MSB) and a second input signal IS2 corresponding to the least significant bit (LSB). The plurality of encoded signals ES1 to ES3 may include the first encoded signal ES1 corresponding to a most significant bit of the multi-bit binary number (e.g., a 3-bit number exemplified in FIG. 3) represented by the encoded signal, the second encoded signal ES2 corresponding to the middle bit of the multi-bit binary number, and the third encoded signal ES3 corresponding to the least significant bit of the multi-bit binary number.

According to an embodiment, an edge adjustment circuit 220 including a plurality of "unit edge adjustment circuits" may be connected to an output terminal of the encoder 210. The number of unit edge adjustment circuits may be equal to the number of bits of the encoded signal. As an example, as shown in FIG. 2, the PAM-4 based transmitter 200 may include three edge adjustment circuits.

According to an embodiment, in order to reduce switching jitter, the first unit edge adjustment circuit 221 may receive the first encoded signal ES1 corresponding to the most significant bit and may adjust the falling edge timing of the first encoded signal ES1. The third unit edge adjustment circuit 223 may receive the third encoded signal ES3 corresponding to the least significant bit and adjust the rising edge timing of the third encoded signal ES3. A delay of a predetermined time may occur in each encoded signal due to the edge adjustment operations of the first unit edge adjustment circuit 221 and the third unit edge adjustment circuit 223.

The second unit edge adjustment circuit 222 may receive the second encoded signal ES2 and adjust the rising edge timing and the falling edge timing of the second encoded signal ES2 by the delay of the predetermined time described above. That is, unlike the other unit edge adjustment circuits 221 and 223, the second unit edge adjustment circuit 222 may delay the edge timing of the second encoded signal ES2 for the predetermined time to synchronize signals. In other words, the first unit edge adjustment circuit 221 and the third unit edge adjustment circuit 223 may advance the encoded signal by the adjustment timing value, but the second unit edge adjustment circuit 222 may delay the encoded signal by a predetermined time.

The first unit edge adjustment circuit 221 and the third unit edge adjustment circuit 223 may reduce the switching jitter of the mid-eye of the output signal OS by advancing the edge timing of the encoded signal by the adjustment timing value.

According to an embodiment, a driver circuit 230 including a plurality of drivers may be connected to the output terminal of the plurality of edge adjustment circuits 220. Likewise, the number of drivers may be equal to the number of unit edge adjustment circuits.

A first driver 231 may operate according to the first adjusted encoded signal A_ES1. A second driver 232 may operate according to the second adjusted encoded signal A_ES2. A third driver 233 may operate according to the third adjusted encoded signal A_ES3. Each driver may perform pull-up and pull-down operations based on the adjusted encoded signals and output a PAM-4 output signal OS with four levels. This will be further explained later in connection with FIG. 10. According to an embodiment, each driver may be configured to have the same unit impedance that is turned on or off according to a pull-up or pull-down operation.

According to the above-described embodiments, the transmitter 200 may adjust the edge timing of the encoded signal corresponding to the most significant bit and the encoded signal corresponding to the least significant bit through the edge adjustment circuit 220, thereby effectively reducing the switching jitter of the mid-eye of the PAM-4 output signal OS. This will be explained in connection with FIG. 5 and other figures later.

FIG. 3 illustrates a truth table between the input signal and the encoded signal of FIG. 2. Hereinafter, for convenience of explanation, the operation of the transmitter will be described based on the PAM-4-based transmitter of FIG. 2, but embodiments of the present disclosure are not limited thereto, and the transmitter may be applied not only to PAM-4 but also to other x multi-level signaling schemes.

Referring to FIG. 3, in the case of the PAM-4 scheme, the input signal IS may be expressed as a combination of 2 bits (00, 01, 10, 11) including MSB and LSB. Combinations may sequentially correspond to four respective levels of a PAM-4 output signal. For example, the combination 00 may correspond to the lowest level "lev1", and the combination 11 may correspond to the highest level "lev4".

The encoder may output the input signal IS as an encoded signal through thermometer encoding. For example, the encoder may encode the combination 00 into an encoded signal 000 (the first encoded signal ES1 is '0', the second encoded signal ES2 is '0', and the third encoded signal ES3 is '0'). The encoder may encode the combination 01 into an encoded signal of 001 (the first encoded signal ES1 is '0', the second encoded signal ES2 is '0', and the third encoded signal ES3 is '1'). The encoder may encode the combination 10 into an encoded signal 011 (the first encoded signal ES1 is '0', the second encoded signal ES2 is '1', and the third encoded signal ES3 is '1'). The encoder may encode the combination 11 into an encoded signal 111 (the first encoded signal ES1 is '1', the second encoded signal ES2 is '1', and the third encoded signal ES3 is '1'). In this case, the first encoded signal ES1 may correspond to the most significant bit, and the third encoded signal ES3 may correspond to the least significant bit.

Figure 4:
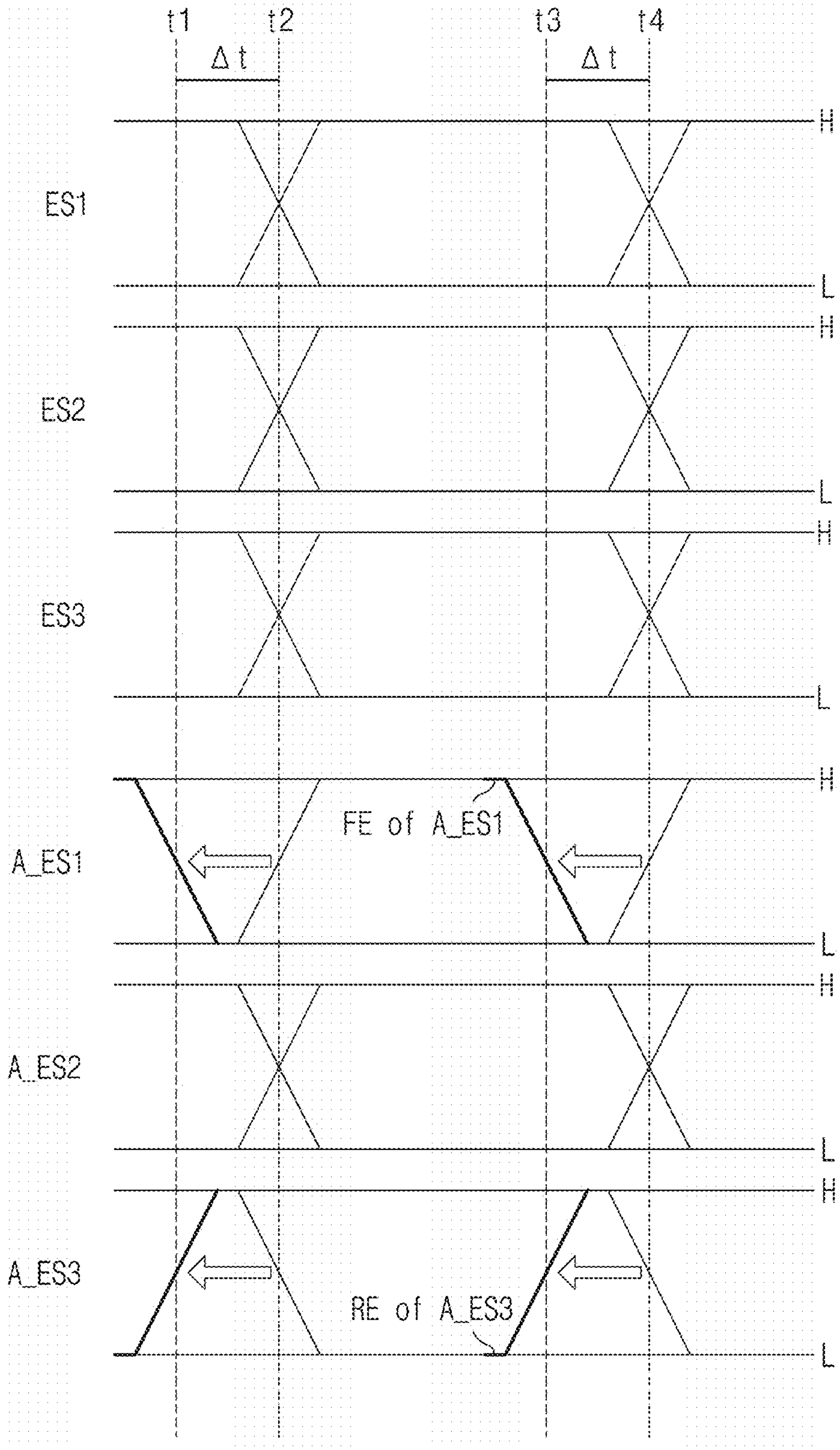
FIG. 4 is a timing diagram schematically illustrating the encoded signal and adjusted encoded signal of FIG. 2.

FIG. 4 is a timing diagram schematically illustrating the encoded signal and adjusted encoded signal of FIG. 2. FIG. 4 is also applicable to the encoding scheme of FIG. 3.

Referring to FIG. 4, a timing diagram of each of a plurality of encoded signals is illustrated. Because each encoded signal has either H (logic high) or L (logic low), the timing diagram may illustrate transitions between H and L. In addition, because the encoded signals ES1-ES3 are not adjusted yet, the rising edge or falling edge when each signal transitions is symmetrical with respect to t2 or t4, where t4 is one cycle later than t2.

To reduce switching jitter, a falling edge timing FE of the first encoded signal ES1 may be adjusted back (i.e., advanced, so that FE occurs sooner) by an adjustment timing value Δt, and a rising edge timing RE of the third encoded signal ES3 may be advanced by the adjustment timing value Δt. Accordingly, the center of the falling edge timing FE of the first adjusted encoded signal A_ES1 and the center of the rising edge timing RE of the third adjusted encoded signal A_ES3 may be adjusted from t2 to t1 and from t4 to t3. Note that a "look ahead" scheme or edge detection scheme may be used by the edge adjustment circuit 220 to determine whether the next transition of the encoding signal ES1 will be a falling edge and whether the next transition of the encoding signal ES3 will be a rising edge. For instance, if the 2-bit sequence of the input signal IS associated with the time interval just prior to t1 is 11, and the next 2-bit sequence (associated with the time interval between t2 and t3) is 00, 01 or 10, then ES1 would have a falling edge at t2 if no advance is applied. However, since a falling edge is expected, an advance in the falling edge would be applied such that the falling edge begins sooner and the midpoint of the falling edge may occur at time t1. On the other hand, ES1 would remain at a logic high level if the next 2-bit sequence is also 11. One way to implement the advance in just the falling edges of A_ES1 is to use a predetermined delay slightly greater then Δt when no initial falling edge is detected, and to bypass the delay when an initial falling edge is detected. A similar predetermined delay may be implemented for ES2 for every signal interval (since no advances are implemented for ES2), and for ES3 (where the delay is bypassed for ES3 whenever a rising edge is initially detected).

Through use of the first adjusted encoded signal A_ES1 and the third adjusted encoded signal A_ES3 whose edge timings are adjusted as shown in FIG. 4, the switching jitter of the output signal output through the driver circuit may be reduced.

Note that the output signal level OS may be the sum of voltages output by the drivers 231, 232 and 233, where a logic high (H) output voltage of the driver 231 associated with ES1 is higher than a logic high output voltage of the driver 232, and a logic high output voltage of the driver 232 is higher than that of the driver 223. In other words, a weighted approach may be used for the driver outputs to generate the desired four output levels, which are based on the adjusted encoded signals.

Figure 5:
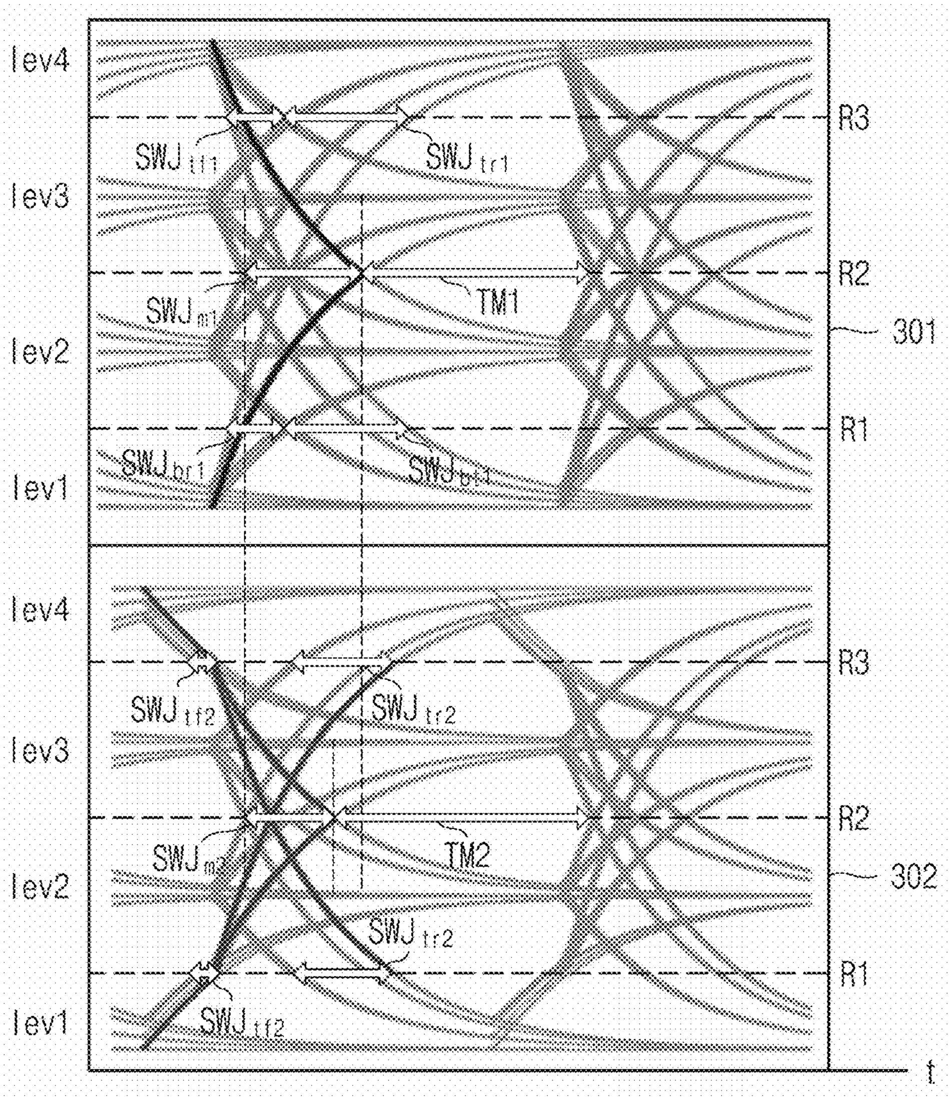
FIG. 5 illustrates an eye diagram of an output signal corresponding to the timing diagram of FIG. 4.

FIG. 5 illustrates an eye diagram of an output signal corresponding to the timing diagram of FIG. 4.

Referring to FIG. 5, in general, the eye diagram of the output signal may be illustrated in a form in which the waveform of the signal corresponding to each level of the above-described multi-level and the waveforms of the signals transitioning from one level to another are overlapped.

The eye diagram illustrates overlapping waveforms for one period, which is the minimum unit for transition between levels. In addition, the eye diagram may include a top section where the top eye is located, a mid section where the mid eye is located, and a bottom section where the bottom eye is located, and illustrates the reference level of a reference signal for each section. In this case, the reference signal may be a signal used by a receiver connected to the transmitter to decode the output signal.

The x levels, which are multi-level, may include a highest level, a first intermediate level, a second intermediate level lower than the first intermediate level, and a lowest level. In this case, the first intermediate level and the second intermediate level may be defined as those closest to a second reference level R2 of the mid section. In FIG. 5, because the PAM-4 output signal is shown, the multi-level may include a fourth level corresponding to the highest level, a third level corresponding to the first intermediate level, a second level corresponding to the second intermediate level, and a first level corresponding to the lowest level.

Each level of the multi-level may transition to another level. As shown in FIG. 5, in the case of the PAM-4 output signal, a total of 12 transitions may appear. Hereinafter, in the present disclosure, for convenience, a (4-1)-th transition (transition from level 4 to level 1), a (1-4)-th transition (transition from level 1 to level 4), a (3-1)-th transition (transition from level 3 to level 1), a (2-4)-th transition (transition from level 2 to level 4), a (4-2)-th transition (transition from level 4 to level 2), a (1-3)-th transition (transition from level 1 to level 3), a (3-2)-th transition (transition from level 3 to level 2), a (2-3)-th transition (transition from level 2 to level 3), a (4-3)-th transition (transition from level 4 to level 3), and a (1-2)-th transition (transition from level 1 to level 2) are defined.

In the eye diagram, the switching jitter may be defined for the top section where the top eye is located, the mid section where the mid eye is located, and the bottom section where the bottom eye is located. In general, the switching jitter may be defined as the time length between the outermost transitions based on the reference level included in each section and one unit transition.

For example, in the case of the top section, the time length between the (4-1)-th transition and the (1-4)-th transition based on a third reference level R3 may be defined as top switching jitter. In the case of the mid section, the time length between the (4-2)-th transition (or the (1-3)-th transition) and the (3-1)-th transition (or the (2-4)-th transition) based on a second reference level R2 may be defined as mid switching jitter. In the case of the bottom section, the time length between the (4-1)-th transition and the (1-4)-th transition based on a first reference level R1 may be defined as bottom switching jitter.

In addition, the top switching jitter may include top falling switching jitter defined based on falling edges (i.e., all transitions from the upper level to the lower level) and top rising switching jitter defined as rising edges (i.e., all transitions from the lower level to the upper level). The bottom switching jitter may similarly include bottom falling switching jitter defined based on falling edges and bottom rising switching jitter defined based on rising edges.

According to the above-described embodiments, as the falling edge timing of the first encoded signal and the rising edge timing of the third encoded signal are adjusted through the edge adjustment circuit, each transition of the output signal may also be adjusted. In detail, the edge adjustment circuit may advance the edges corresponding to the (4-1)-th transition, the (4-2)-th transition, and the (4-3)-th transition by adjusting the falling edge timing of the first encoded signal. In addition, the edge adjustment circuit may adjust the rising edge timing of the third encoded signal to advance the edges corresponding to the (1-4)-th transition, the (1-3)-th transition, and the (1-2)-th transition.

In this case, regarding the mid-eye, it may be confirmed that the intersection of the (4-2)-th transition and the (1-3)-th transition, which has the greatest influence on the mid-switching jitter of an output signal 302 after adjustment, is earlier than before adjustment 301. Conversely, because the second encoded signal is not adjusted, it may be confirmed that the intersection of the (3-1)-th transition and the (2-4)-th transition is maintained. Ultimately, a mid-switching jitter $SWJ_{m2}$ of the output signal 302 after adjustment may be reduced compared to a mid-switching jitter $SWJ_{m1}$ before adjustment.

In addition, as the falling edges of the top eye advance, both top falling switching jitter and top rising switching jitter $SWJ_{tf2}$ and $SWJ_{tr2}$ may be reduced compared to the switching jitter $SWJ_{tf1}$ and $SWJ_{tr1}$ before adjustment. As the rising edges of the bottom eye advance, both bottom falling switching jitter and bottom rising switching jitter $SWJ_{bf2}$ and $SWJ_{br2}$ may be reduced compared to the switching jitter $SWJ_{bf1}$ and $SWJ_{br1}$ before adjustment.

According to the above-described embodiments, the transmitter of the present disclosure may reduce the switching jitter of the mid-eye through the edge adjustment circuit, while simultaneously reducing the top rising switching jitter, top falling switching jitter, bottom rising switching jitter, and bottom falling switching jitter. Accordingly, the transmitter of the present disclosure may reduce the switching jitter and ensure a timing margin TM2 of the output signal greater than a timing margin TM1 before adjustment.

Figure 6:
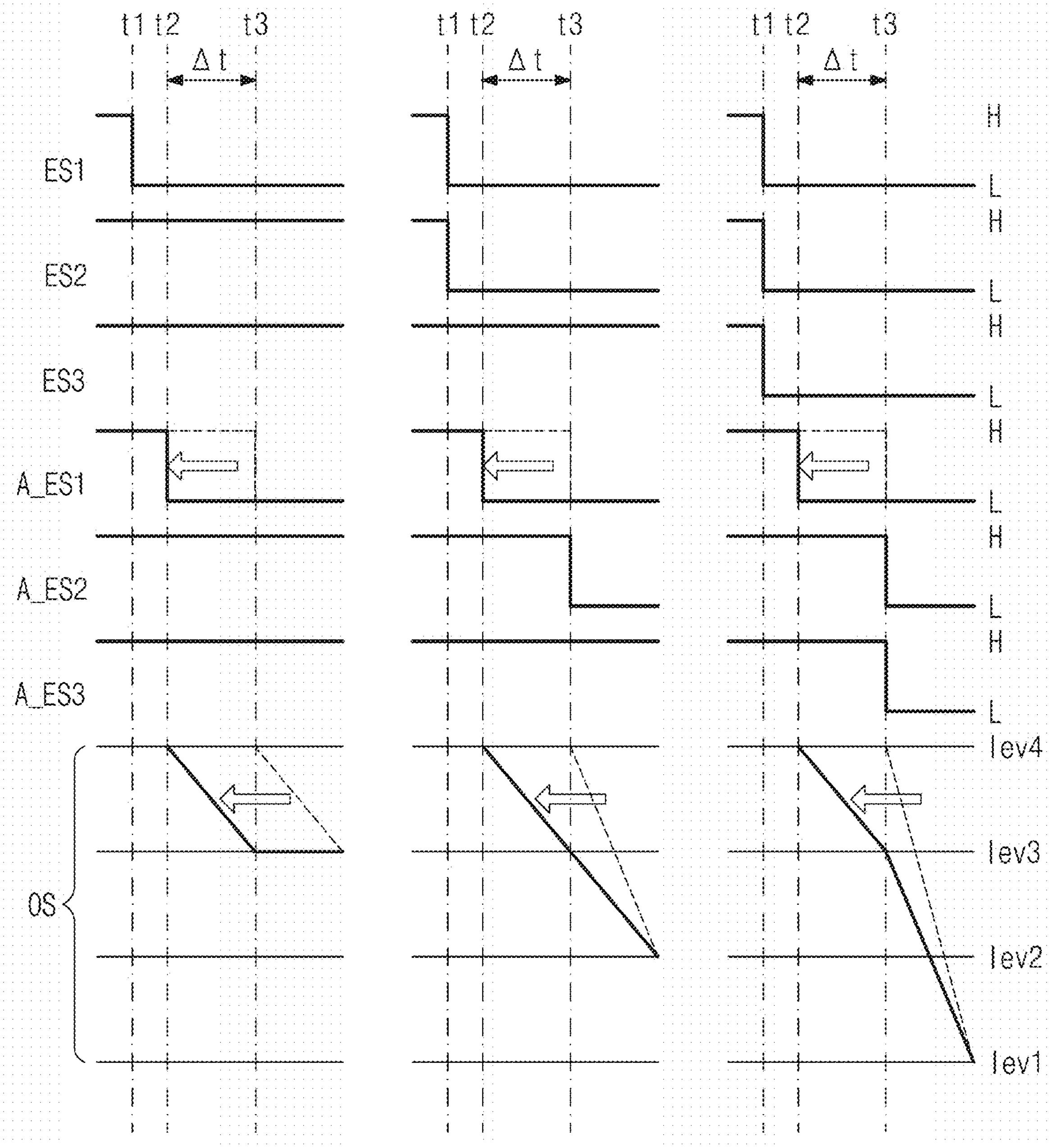
FIG. 6 is a timing diagram of an encoded signal, an adjusted encoded signal, and an output signal according to falling edge timing adjustment.

FIG. 6 is a timing diagram of an encoded signal, an adjusted encoded signal, and an output signal, illustrating falling edge timing adjustment.

Referring to FIG. 6, in the case of transitions in which a falling edge occurs in the first encoded signal (ES1) (i.e., a combination of encoded signals transitions from 111 to 011, from 111 to 001, or from 111 to 000), the first encoded signal ES1 may be adjusted in each case by advancing by the adjustment timing value according to the above-described embodiments.

In this case, as each encoded signal is processed and output through the edge adjustment circuit, a predetermined delay (the length of time from t1 to t3) occurs in the adjusted encoded signal. That is, the falling edge of the adjusted encoded signal moves from t1 to t3 due to the delay caused by the operation of the edge adjustment circuit, but the falling edge is finally located at t2 due to the adjustment operation of the edge adjustment circuit.

Regarding each case, when a combination of encoded signals transitions from 111 to 011, the edge adjustment circuit performs an operation of locating the first encoded signal ES1 back by the adjustment timing value Δt, and the edge (i.e., the falling edge) of the first adjusted encoded signal A_ES1 is finally located at t2 in consideration of the delay of the operation performing. In addition, the timing at which the output signal OS transitions from the fourth level to the third level is also advanced.

When the combination of the encoded signals transitions from 111 to 001, according to the adjustment operation of the first encoded signal ES1 of the edge adjustment circuit, the edge of the first adjusted encoded signal A_ES1 is finally located at t2. In addition, the edge adjustment circuit may delay the second encoded signal ES2 by the delay according to the adjustment operation in order to synchronize with the first encoded signal ES1 on which adjustment is performed. That is, the edge of the second adjusted encoded signal A_ES2 is located at t3. In addition, the timing at which the output signal OS transitions from the fourth level to the second level is also advanced.

When the combination of encoded signals transitions from 111 to 000, according to the adjustment operation of the first encoded signal ES1 of the edge adjustment circuit, the edge of the first adjusted encoded signal A_ES1 is finally located at t2. In addition, the edge adjustment circuit may delay the second encoded signal ES2 and the third encoded signal ES3 by the delay according to the adjustment operation in order to synchronize with the first encoded signal ES1 on which adjustment is performed. That is, the edges of the second adjusted encoded signal A_ES2 and the third encoded signal ES3 are located at t3. In addition, the timing at which the output signal OS transitions from the fourth level to the first level is also advanced. In this case, the slope for each transition may vary depending on the transition level.

Figure 7:
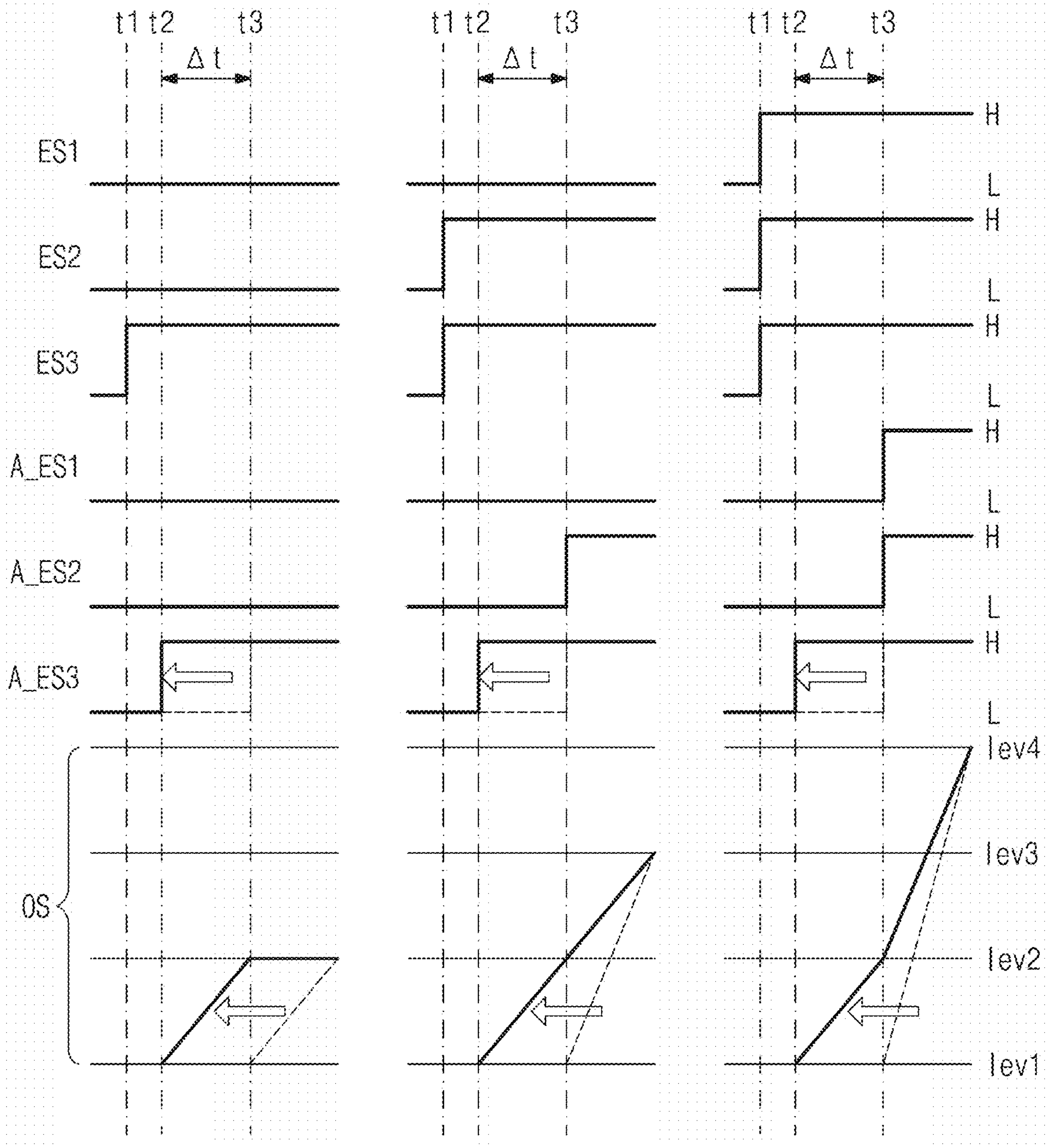
FIG. 7 is a timing diagram of an encoded signal, an adjusted encoded signal, and an output signal according to rising edge timing adjustment.

FIG. 7 is a timing diagram of an encoded signal, an adjusted encoded signal, and an output signal according to rising edge timing adjustment.

Referring to FIG. 7, transitions in which a rising edge occurs in the third encoded signal ES3 (i.e., a combination of encoded signals transitions from 000 to 001, transitions from 000 to 011, or transitions from 000 to 111), the third encoded signal ES3 may be adjusted together as the third encoded signal ES3 is adjusted back by the adjustment timing value Δt according to the above-described embodiments.

Likewise, according to the adjustment operation of the edge adjustment circuit, a predetermined delay (time length from t1 to t3) occurs in the adjusted encoded signal.

Regarding each case, when a combination of encoded signals transitions from 000 to 001, the edge adjustment circuit performs an operation of locating the third encoded signal ES3 back by the adjustment timing value, and the edge (i.e., the rising edge) of the third adjusted encoded signal A_ES3 is finally located at t2 in consideration of the delay of the operation performing. Additionally, the timing at which the output signal OS transitions from the first level to the second level is also advanced.

When the combination of encoded signals transitions from 000 to 011, according to the adjustment operation of the edge adjustment circuit for the third encoded signal ES3, the edge of the third adjusted encoded signal A_ES3 is finally located at t2. In addition, the edge adjustment circuit may delay the second encoded signal ES2 by the delay according to the adjustment operation to synchronize with the third encoded signal ES3 on which adjustment is performed. That is, the edge of the second adjusted encoded signal A_ES2 is located at t3. In addition, the timing at which the output signal OS transitions from the first level to the third level is also advanced.

When the combination of encoded signals transitions from 000 to 111, according to the adjustment operation of the edge adjustment circuit for the third encoded signal ES3, the edge of the third adjusted encoded signal A_ES3 is finally located at t2. In addition, the edge adjustment circuit may delay the first encoded signal ES1 and the second encoded signal ES2 by the delay according to the adjustment operation in order to synchronize with the third encoded signal ES3 on which adjustment is performed. That is, the edges of the first adjusted encoded signal A_ES1 and the second encoded signal ES2 are located at t3. In addition, the timing at which the output signal OS transitions from the first level to the fourth level is also advanced. In this case, the slope for each transition may vary depending on the transition level.

According to the above-described FIGS. 6 and 7, the edge adjustment circuit of the present disclosure may adjust the falling edge timing of the encoded signal corresponding to the most significant bit and the rising edge timing of the encoded signal corresponding to the least significant bit among the plurality of encoded signals by the first adjustment timing value, and may adjust the edge timing of the encoded signal corresponding to the middle bit by the second adjustment timing value, thereby outputting the plurality of adjusted encoded signals. In this case, the first adjustment timing value may be a value for reducing switching jitter, and the second adjustment timing value may be a value set to synchronize with the second encoded signal ES2.

For example, the edge adjustment circuit may adjust the falling edge timing and the rising edge timing to be advanced in time by a first adjustment timing value and delay the edge timing by a second adjustment timing value in the time domain.

Figure 8:
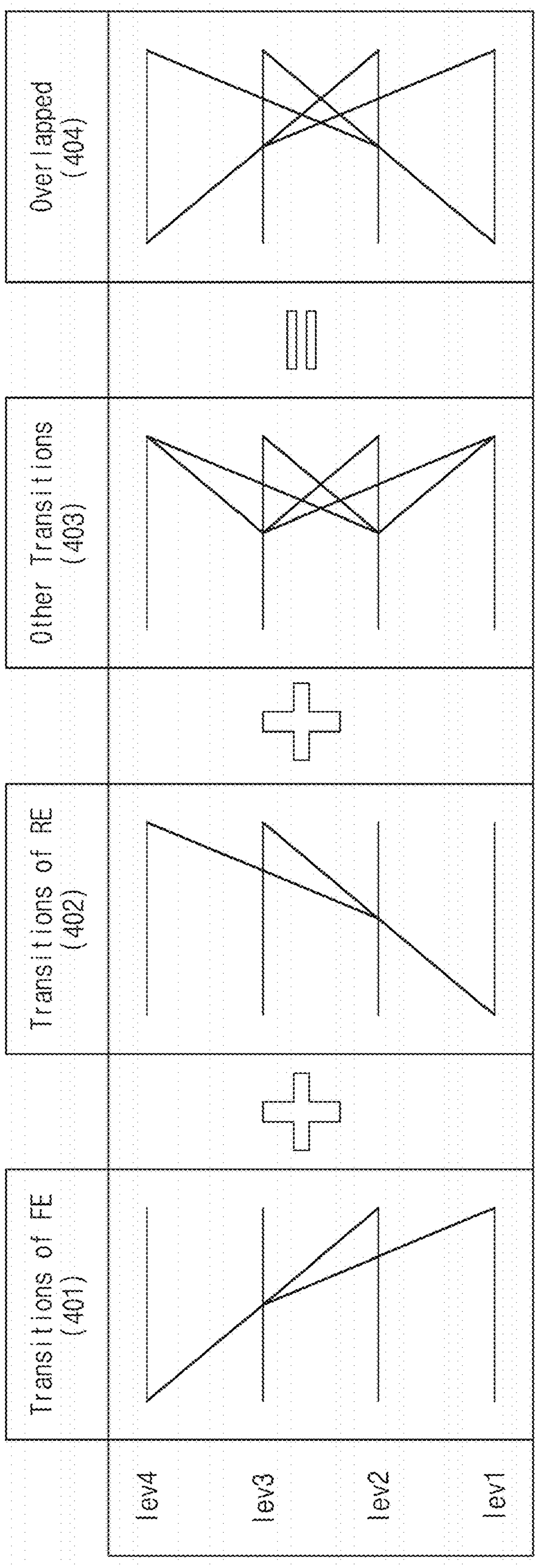
FIG. 8 is a timing diagram in which adjusted transitions and unadjusted transitions of an output signal are superimposed.

FIG. 8 is a timing diagram in which adjusted transitions and unadjusted transitions of an output signal are superimposed.

Referring to FIG. 8, according to the above-described embodiments (FIGS. 6 and 7), the falling edge timing of the transition 401 from the highest level to other levels in the output signal may be adjusted by advancing in time by the adjustment timing value, and the rising edge timing of the transition 402 from the lowest level to other levels may be advanced by the adjustment timing value. In this case, the remaining transitions 403 may remain in the same state.

In the output signal 404 which appears as superposition of the adjusted transitions 401 and 402 and the unadjusted transitions 403, the remaining transitions 403 are still maintained, such that the intersection of the (3-1)-th transition and the (2-4)-th transition is the same even after adjustment. Conversely, the intersection of the (4-2)-th transition and the (1-3)-th transition, which has the greatest influence on the mid-switching jitter, is further advanced after adjustment. Ultimately, because the intersection located last in the time domain among the intersections of the mid switching jitter is further advanced, the mid-switching jitter may be reduced.

According to the above-described embodiments, the transmitter of the present disclosure may adjust the falling edge timing of the encoded signal specifically representing the highest level and the rising edge timing of the encoded signal representing the lowest level back by the adjustment timing value through the edge adjustment circuit, so that the switching jitter of the mid-eye of the output signal output through the adjusted encoded signal may be reduced. Accordingly, the timing margin of the mid-eye of the output signal may be reduced. In addition, the transmitter of the present disclosure may maintain synchronization with other encoded signals by delaying the encoded signal that is not adjusted through the edge adjustment circuit by the time corresponding to the adjustment operation.

Figure 9:
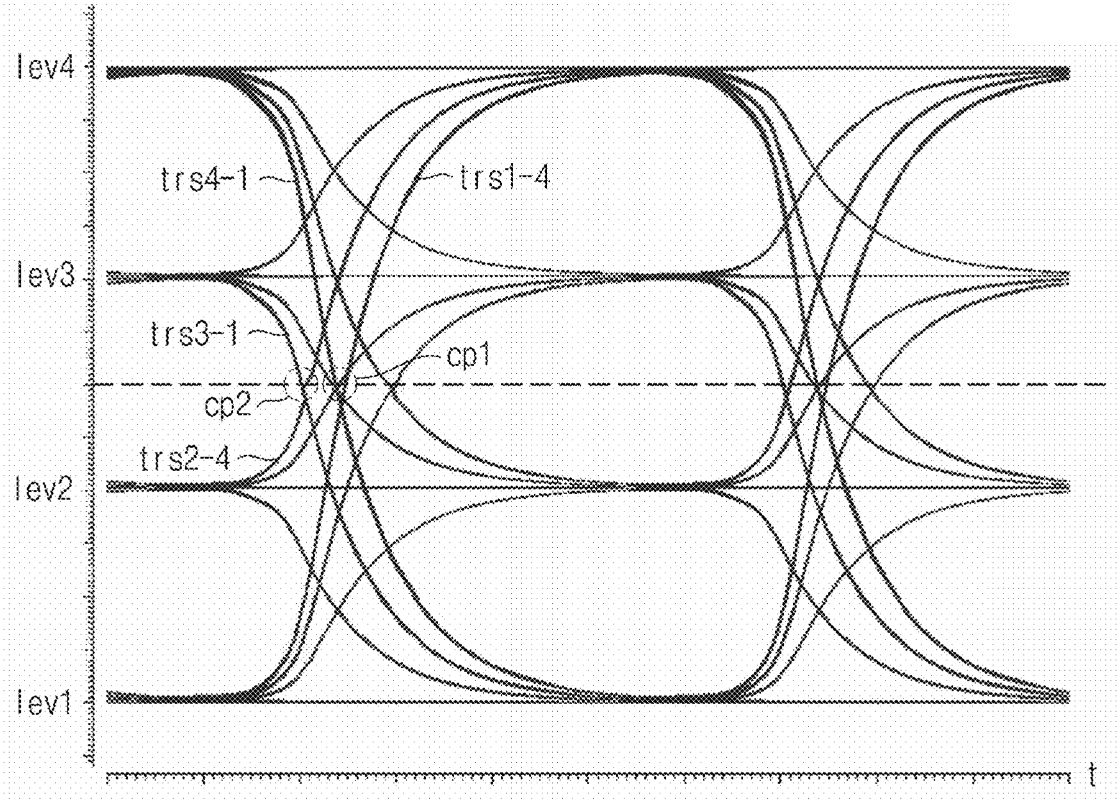
FIG. 9 illustrates a waveform of an output signal for explaining the operation of an edge adjustment circuit according to an adjustment timing value according to an embodiment.

FIG. 9 illustrates a waveform of an output signal for explaining the operation of an edge adjustment circuit according to an adjustment timing value according to an embodiment.

Referring to FIG. 9, the adjustment timing value for edge adjustment according to some example embodiments may be set so that the switching jitter of the mid-eye is not degraded. In other words, the edge adjustment circuit can adjust the edge timing within a range where the mid-eye switching jitter does not deteriorate.

In detail, when the falling edge timings and rising edge timings through the edge adjustment circuit are adjusted by the adjustment timing value, the timing of the x-level transition in the output signal, that is, the transition between the highest level and the lowest level may change together. For example, in the case of the PAM-4 output signal shown, the timings of the three-level transitions (the input signal transitions from 11 to 00 or 00 to 11) may change together.

When the edge timings are advanced by the adjustment timing value, the timing of the three-level transition of the output signal is also advanced. Then, when the intersection of the three-level transition is located earlier in the eye diagram (representing a plurality of transitions in the time domain) than the intersection of the two-level transition (the input signal transitions from 10 to 00 or 01 to 11), the mid-switching jitter increases (i.e. deteriorates) again.

Accordingly, the edge adjustment circuit according to an embodiment may adjust timing such that a first intersection cp1 between a (4-1)-th transition trs4-1 from the highest level to the lowest level and a (1-4)-th transition trs1-4 from the lowest level to the highest level is located later in the eye diagram than a second intersection point cp2 between a (3-1)-th transition trs3-1 from the intermediate level to the lowest level trs3-1 and a (2-4)-th transition trs2-4 from the second intermediate level to the highest level. That is, the adjustment timing value may be set to values that allow the first intersection cp1 constituting the mid-switching jitter in the output signal to be located later than the second intersection cp2.

According to the above-described embodiments, when the transmitter reduces mid-switching jitter through the edge adjustment circuit, the mid-switching jitter may be minimized within the range where the mid-switching jitter is not degraded.

According to an embodiment, the adjustment timing value for edge adjustment may be set such that the switching jitters of the top eye and bottom eye are not degraded. That is, the edge adjustment circuit may adjust edge timing within a range where the switching jitters of the top eye and bottom eye are not degraded.

In detail, the edge adjustment circuit may adjust the falling edge timing and the rising edge timing such that the (4-1)-th transition trs4-1 is located later in the eye diagram than the (3-1)-th transition trs3-1. Alternatively, the edge adjustment circuit may adjust the falling edge timing and the rising edge timing such that the (1-4)-th transition trs1-4 is located later than the (2-4)-th transition trs2-4 in the eye diagram.

According to the above-described embodiments, because the edge adjustment circuit adjusts the falling edge timing and the rising edge timing together, the top switching jitter and the bottom switching jitter may have the same size until the (4-1)-th transition trs4-1 overlaps the (3-1)-th transition trs3-1 or the (1-4)-th transition trs1-2 overlaps the (2-4)-th transition trs2-4. However, as falling edge timings change more than rising edge timings from the time point at which the (4-1)-th transition trs4-1 is located before the (3-1)-th transition trs3-1 in the eye diagram, or the (1-4)-th transition trs1-4 is located before the (2-4)-th transition trs3-1, the top switching jitter and bottom switching jitter may deteriorate.

Accordingly, the edge adjustment circuit according to an embodiment may perform an edge adjustment operation within a range where the (4-1)-th transition trs4-1 overlaps the (3-1)-th transition trs3-1 or the (1-4)-th transition trs1-4 does not overlap the (2-4)-th transition trs2-4, so that it is possible to prevent the top switching jitter and bottom switching jitter from deteriorating. That is, the adjustment timing value may be set to values that enable the (4-1)-th transition trs4-1 to be positioned after the (3-1)-th transition trs3-1 in the output signal, or the (1-4)-th transition trs1-4 to be positioned after the (3-1)-th transition trs3-1.

Figure 10:
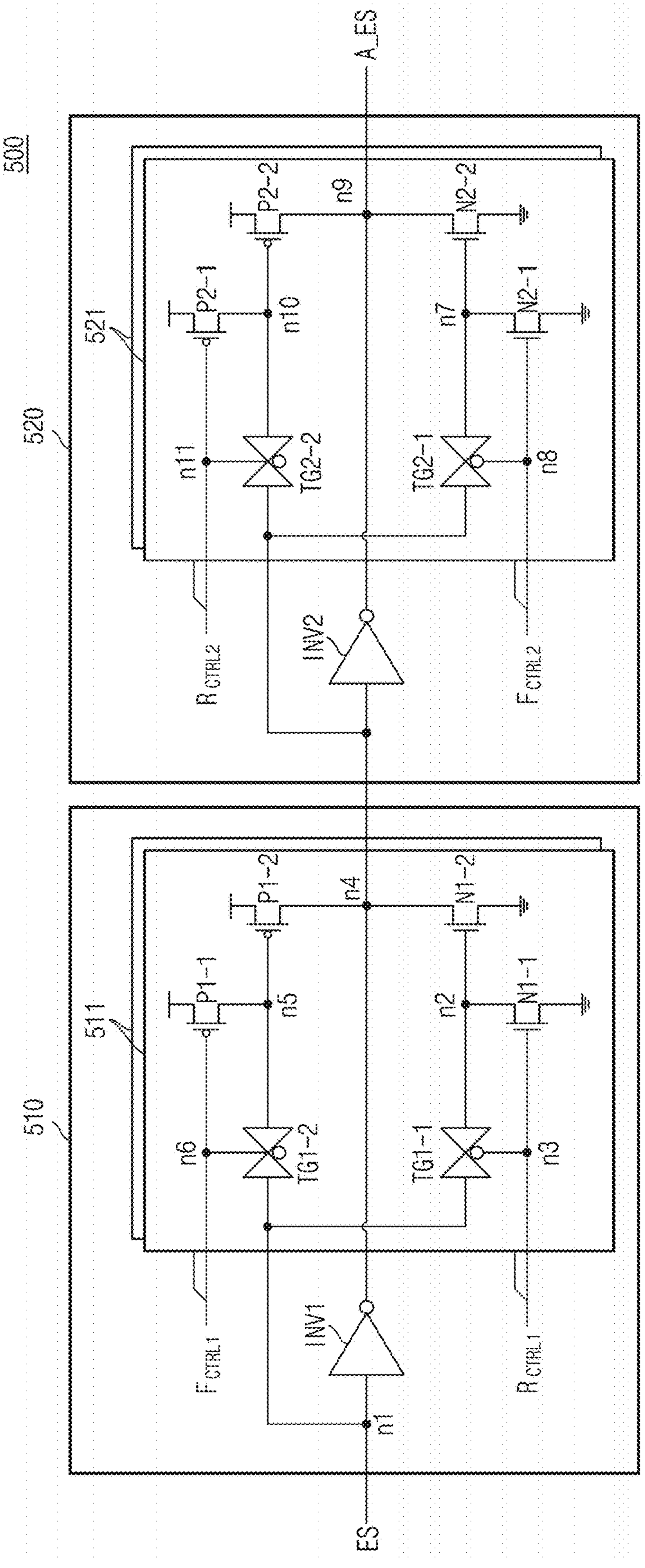
FIG. 10 is a circuit diagram of an edge adjustment circuit according to an embodiment.

FIG. 10 is a circuit diagram of an edge adjustment circuit according to an embodiment.

Referring to FIG. 10, an edge adjustment circuit 500 according to an embodiment may include an input circuit 510 and an output circuit 520. For example, the edge adjustment circuit 500 may be an example of the edge adjustment circuit of FIGS. 1 and 2 described above.

The input circuit 510 may receive the encoded signal ES. The input circuit 510 may include a first inverter INV1 and a plurality of first stage circuits 511. Each of the plurality of first stage circuits 511 may include a transmission gate TG1-1, a transmission gate TG1-2, a N-type transistor N1-1, a N-type transistor N1-2, a P-type transistor P1-1, and a P-type transistor P1-2.

The first inverter INV1 may invert the encoded signal ES and output it to a fourth node n4. The inverted encoded signal may be transmitted to the output circuit 520 through the fourth node n4.

The transmission gate TG1-1 may switch a connection path between a first node n1 to which the encoded signal ES is applied, and a second node n2 connected to the drain of the transistor N1-1 and the gate of the transistor N1-2 based on a first "rising control signal" $R_{CTRL1}$. The first rising control signal $R_{CTRL1}$ may be applied to the transistor N1-1 through a third node n3 connected to the gate of the transistor N1-1, in which the source of transistor N1-1 may be grounded, and the drain may be connected to the second node n2. The gate of the transistor N1-2 may be connected to the second node n2, the source may be grounded, and the drain may be connected to the fourth node n4.

The transmission gate TG1-2 may switch a connection path from the first node n1 to which the encoded signal ES is applied, and a fifth node n5 connected to the drain of the transistor P1-1 and the gate of the transistor P1-2 based on a first "falling control signal" $F_{CTRL1}$. The first falling control signal $F_{CTRL1}$ may be applied to the transistor P1-1 through a sixth node n6 connected to the gate of the transistor P1-1, a driving voltage may be applied to the source, and the drain may be connected to the fifth node n5. The gate of the transistor P1-2 may be connected to the fifth node n5, the driving voltage may be applied to the source, and the drain may be connected to the fourth node n4.

The first rising control signal $R_{CTRL1}$ and the first falling control signal $F_{CTRL1}$ may have a bit size equal to the number of the plurality of first stage circuits 511. In the example of FIG. 10, the control signal is 2 bits. The control signal may turn on or off at least one stage circuit depending on the bit combination.

In detail, the transistor N1-1 and the transistor P1-1 may be turned on or off according to each control signal. The transistor N1-2 and the transistor P1-2 may adjust the delay of the encoded signal ES according to the number of turn-ons or turn-offs. For example, the smaller the resistance of the transistor N1-2, the smaller the pull-down delay of the output n4 of the input circuit 510, so the falling edge timing is advanced, and thus the rising edge timing of an output A_ES of the output circuit 520 is advanced. Conversely, the smaller the resistance of the transistor P1-2, the smaller the pull-up delay of the output n4 of the input circuit 510, so the falling edge timing of the output A_ES of the output circuit 520 is advanced.

The output circuit 520 may receive the inverted encoded signal from the first inverter INV1 of the input circuit 510. The output circuit 520 may include a second inverter INV2 and a plurality of second stage circuits 521. Each of the second stage circuits 521 may include a transmission gate TG2-1, a transmission gate TG2-2, a N-type transistor N2-1, a N-type transistor N2-2, a P-type transistor P2-1, and a P-type transistor P2-2. Hereinafter, detailed description of parts overlapping with the input circuit 510 will be omitted.

The inverter INV2 may re-invert the encoded signal ES inverted in the first inverter INV1 and output it to a ninth node n9.

The transmission gate TG2-1 may switch the fourth node n4 to which the inverted encoded signal is applied and a seventh node n7 connected to the drain of the transistor N2-1 and the gate of the transistor N2-2, based on a second falling control signal $F_{CTRL2}$. The second falling control signal $F_{CTRL2}$ may be applied through an eighth node n8 connected to the gate of the transistor N2-1, the source may be grounded, and the drain may be connected to the seventh node n7. The gate of the transistor N2-2 may be connected to the seventh node n7, the source may be grounded, and the drain may be connected to a ninth node n9.

The transmission gate TG2-2 may switch the fourth node n4 to which the inverted encoded signal is applied and a tenth node n10 connected to the drain of the transistor P2-1 and the gate of the transistor P2-2, based on a second rising control signal $R_{CTRL2}$. A second rising control signal $R_{CTRL2}$ may be applied through a 11-th node n11 connected to the gate of the transistor P2-1, a driving voltage may be applied to the source, and the drain may be applied to the tenth node n10. The gate of the transistor P2-2 may be connected to the tenth node n10, the driving voltage may be applied to the source, and the drain may be connected to the ninth node n9.

The output circuit 520 may adjust the pull-up delay or pull-down delay based on the second rising control signal $R_{CTRL2}$ and the second falling control signal $F_{CTRL2}$. Finally, the rising edge timing and falling edge timing of the adjusted encoded signal A_ES output through the ninth node n9 may be adjusted.

As an example, FIG. 10 illustrates that the number of first stage circuits 511 and the number of second stage circuits 521 is two each, but embodiments of the present disclosure are not limited thereto. That is, the number of first stage circuits 511 and the number of second stage circuits 521 may be set or implemented in various manners depending on how much the edge timing is adjusted step by step.

The above-described edge adjustment circuit 500 of FIG. 10 according to an embodiment is merely exemplary, and in addition, the edge adjustment circuit 500 may be implemented in various forms to independently adjust the edge of each encoded signal ES.

Figure 11:
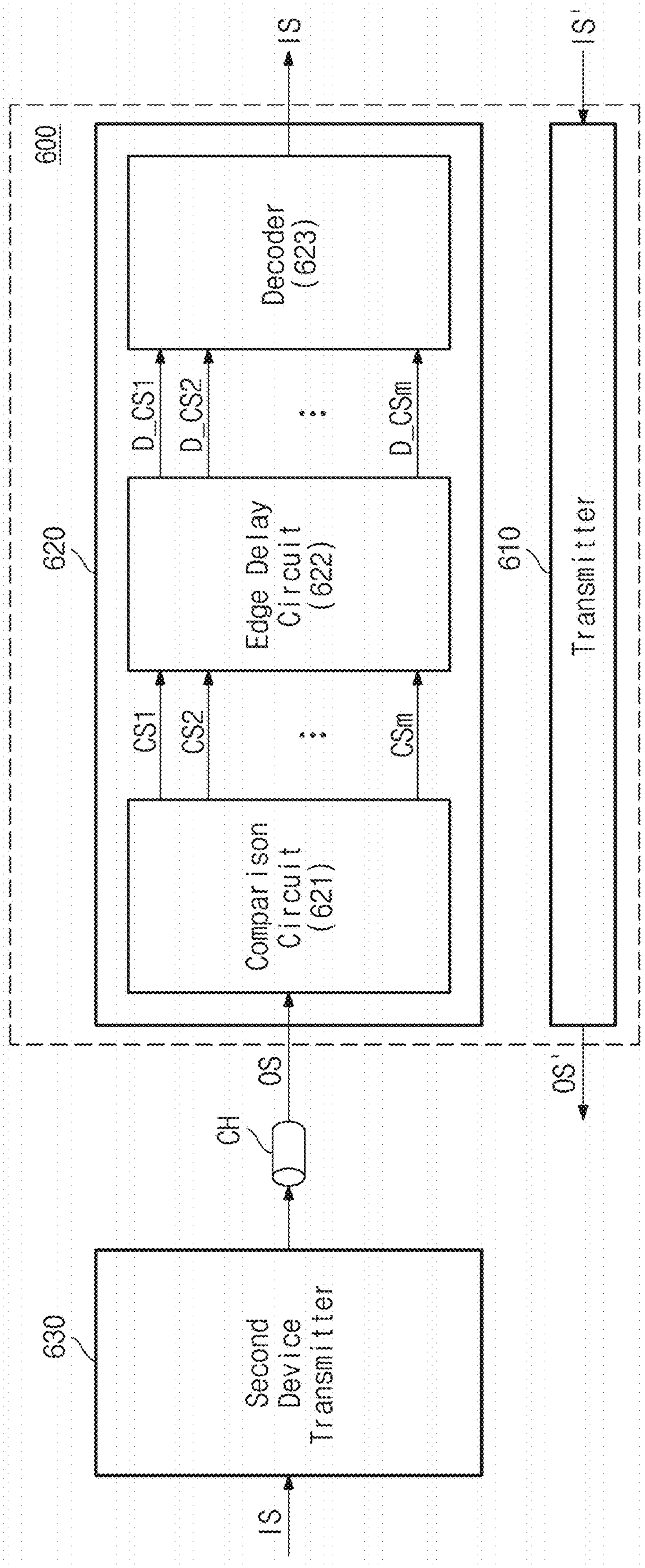
FIG. 11 illustrates a data communication system and a transceiver according to an embodiment.

FIG. 11 illustrates a data communication system according to an embodiment. The data communication system includes a transceiver 600 (e.g., part of a first communicating device) that may include a transmitter 610 and a receiver 620. The receiver 620 may be connected to a second device transmitter 630 through a channel CH. (Although not illustrated, if the second device transmitter 630 is part of a transceiver of the second device, and the channel CH allows for bidirectional signal exchange, the transmitter 610 may also be connected to the same channel CH for transmitting an output signal OS' to the second device transceiver. In another example, a different channel may be used for transmitting the output signal OS' to the second device transceiver.)

Alternatively, the channel CH is within the same device as the transmitter 610 and the receiver 620, such that data communication occurs between the transmitter 610 and the receiver 620. In this case, the second device transmitter 630 is omitted, the output signal OS' from the transmitter 610 is output to the channel CH which routes the same to the receiver 620, and the receiver 620 recovers an original input signal IS' represented as a multi-level signal by the output signal OS'.

Each of the transmitter 610 and the second device transmitter 630 may be implemented or operate according to the above-described embodiments. Thus, the transmitter 610 and the second device transmitter 630 may be configured to output an output signal OS' and OS, respectively, having x levels based on the adjustment of the falling edge timing of an encoded signal corresponding to the most significant bit and the rising edge timing of the encoded signal corresponding to the least significant bit among a plurality of encoded signals obtained by encoding an input signal.

The receiver 620 may be connected to the second device transmitter 630 through the channel CH, and configured to receive the output signal OS from the transmitter 630 and obtain the input signal IS from the output signal OS. The receiver 620 according to an embodiment may include a comparison circuit 621, an edge delay circuit 622, and a decoder 623.

The comparison circuit 621 may be configured to receive the output signal OS and, based on a comparison between the received output signal OS and a plurality of reference signals, output a plurality of comparison signals CS1 to CSm each having two signal levels. The output signal OS received by the comparison circuit 621 may have x levels as described above. The plurality of reference signals may have different values and may be set to a value between two adjacent levels among x levels. For example, the plurality of reference signals may include the above-described first to third reference levels R1 to R3.

The plurality of comparison signals CS1 to CSm output through the comparison operation of the comparison circuit 621 may each have, at any given time, one of two signal levels according to the result of comparison between the output signal OS and the plurality of reference signals. For example, when the output signal OS is less than a specific reference signal, a specific comparison signal may indicate logic low (0), and when the output signal OS is higher than the specific reference signal, the specific comparison signal may indicate logic high (1). These logic values are just examples and may alternatively be set opposite to that just described.

Among the plurality of comparison signals CS1 to CSm, the edge delay circuit 622 may be configured to delay the falling edge timing of the comparison signal CS1 corresponding to the most significant bit and the rising edge timing of the comparison signal CSm corresponding to the least significant bit, and output a plurality of delayed comparison signals D_CS1 to D_CSm. The edge delay circuit 622 may improve switch jitter compared to the output signal OS before delay and may delay the edge timing by a delay timing value at which skew between data may be minimized.

The decoder 623 may be configured to obtain the input signal IS by decoding the plurality of delayed comparison signals D_CS1 to D_CSm. The input signal IS obtained through decoding may have the same n-bit size as each of the input signal IS input to the second device transmitter 630 and an input signal IS' input to the transmitter 610.

According to the above-described embodiments, the transceiver 600 of the present disclosure may reduce switching jitter by adjusting the edge timing at the transmitter 610 stage (where a similar or same edge timing adjustment is done at the second device transmitter 630), and the receiver 620 may delay the edge timing to improve switching jitter and minimize skew.

Figure 12:
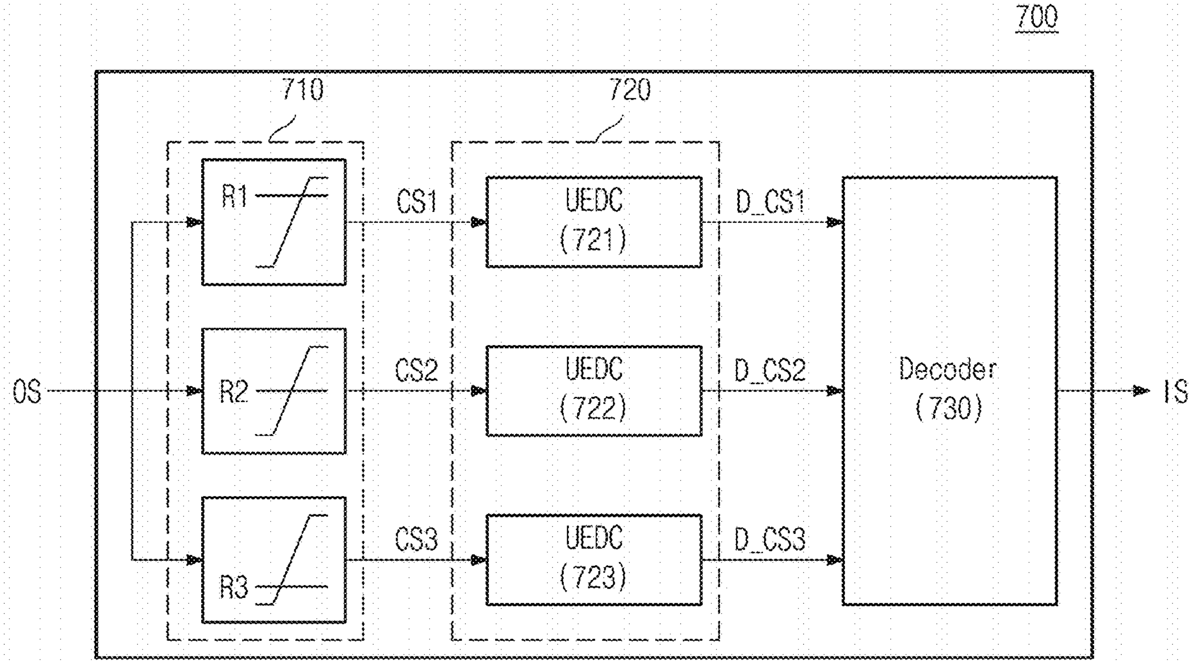
FIG. 12 illustrates a receiver according to an embodiment.

FIG. 12 illustrates a receiver according to an embodiment.

Referring to FIG. 12, a receiver 700 according to an embodiment may include a comparison circuit 710, an edge delay circuit 720, and a decoder 730. The comparison circuit 710 may include a plurality of comparators, and the edge delay circuit 720 may include a plurality of unit edge delay circuits.

Each of the plurality of comparators may receive the output signal OS from a communicating transmitter (e.g., 630) and compare the output signal OS with one reference signal. A first comparator may compare the input signal IS with a first reference signal R1 to output a first comparison signal CS1. A second comparator may compare the input signal IS with a second reference signal R2 to output a second comparison signal CS2. A third comparator C3 may compare the input signal IS with a third reference signal R3 to output a third comparison signal CS3.

For example, the first comparator may output '0' when the input signal IS is smaller than the first reference signal R1 and the first comparison signal CS1 may have a logic low (L) value. The first comparator may output '1' when the input signal IS is greater than the first reference signal R1 and the first comparison signal CS1 may have a logic high (H) value.

When the input signal IS is smaller than the second reference signal R2, the comparator may output '0', and the second comparison signal CS2 may be '0'. The second comparator C2 may output '1' when the input signal IS is greater than the second reference signal R2, and the second comparison signal CS2 may be '1'. The third comparator C3 may output '0' when the input signal IS is smaller than the third reference signal R3, and the third comparison signal CS3 may be '0'. The third comparator C3 may output '1' when the input signal IS is greater than the third reference signal R3, and the third comparison signal CS3 may be '1'.

Each of the plurality of unit edge delay circuits may delay the edge timing of the comparison signal output from the comparison circuit 710. In detail, the first unit edge delay circuit 721 may output a first delayed comparison signal D_CS1 by delaying the falling edge timing of the first comparison signal CS1 corresponding to the most significant bit by the delay timing value. The third unit edge delay circuit 723 may output a third delayed comparison signal D_CS3 by delaying the rising edge timing of the third comparison signal CS3 corresponding to the least significant bit by the delay timing value.

For example, the delay timing value may be set to a value such that the falling edge timing of the first comparison signal CS1 may intersect with at least one rising edge timing in the first comparison signal CS1, and the rising edge timing of the third comparison signal CS3 may intersect with at least one falling edge timing in the third comparison signal CS3.

The second unit edge delay circuit 722 may delay the edge timing of the second comparison signal CS2 to synchronize with the comparison signal whose edge timing is delayed.

The decoder 730 may receive first to third delayed comparison signals D_CS1 to D_CS3 from the plurality of unit edge delay circuits 720, and obtain the input signal IS by decoding the first to third delayed comparison signals D_CS1 to D_CS3.

Figure 13:
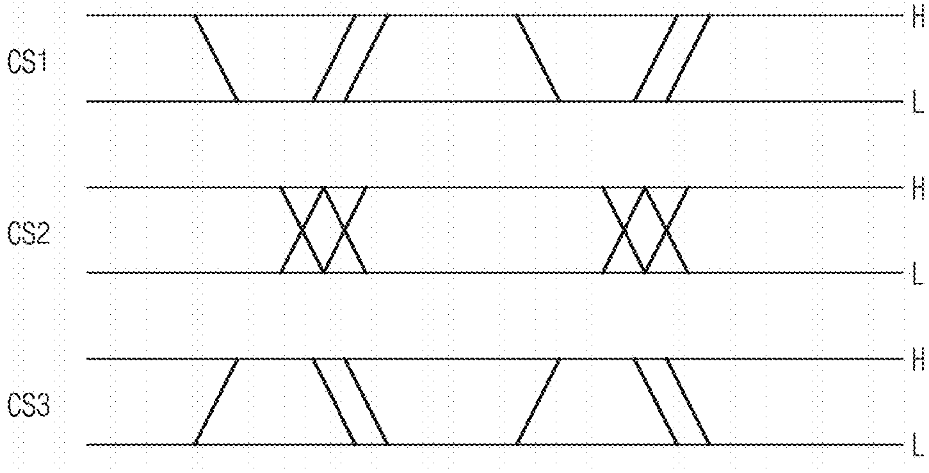
FIGS. 13 and 14 are timing diagrams of the comparison signal and the delayed comparison signal of FIG. 12.
Figure 14:
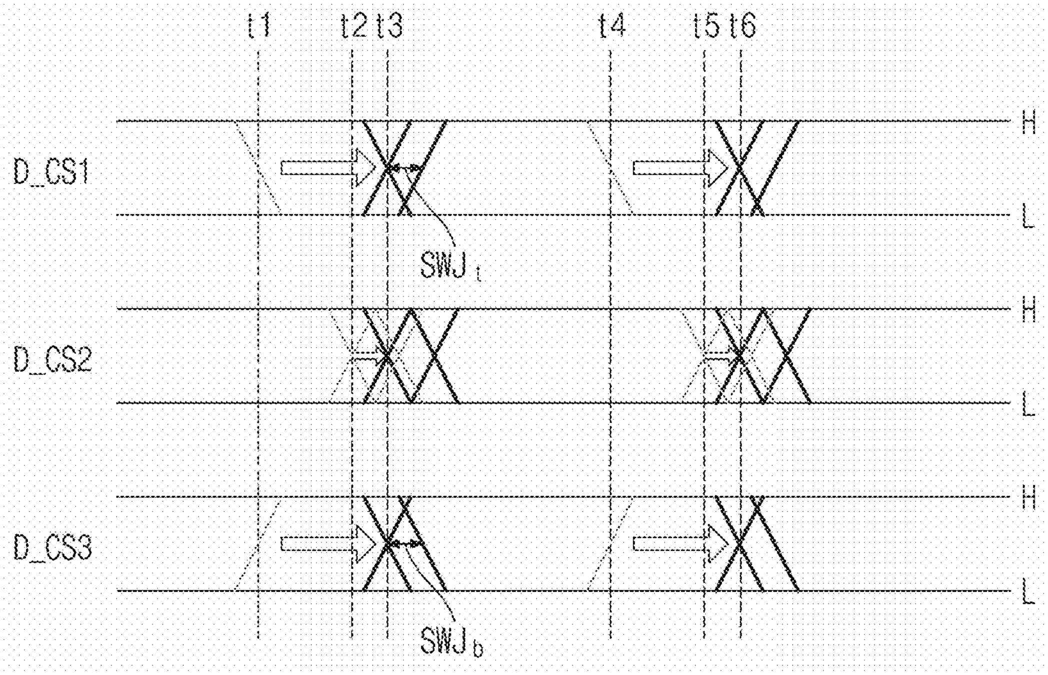

FIGS. 13 and 14 are timing diagrams of the comparison signal and the delayed comparison signal of FIG. 12.

First, referring to FIG. 13, the first comparison signal CS1 and the third comparison signal CS3 output from the comparison circuit have the falling edge timing and rising edge timing spaced apart from each other by a predetermined interval due to an edge timing adjustment operation of the transmitter according to an embodiment. Therefore, the top switching jitter and bottom switching jitter are larger than the mid switching jitter.

Referring to FIG. 14, a plurality of delayed comparison signals may each be delayed by a predetermined interval through an edge delay circuit. For example, the falling edge timing of the first delayed comparison signal D_CS1 may be delayed from t1 to t3, and the falling edge timing of the third delayed comparison signal D_CS3 may also be delayed from t1 to t3. In addition, the edge timings of the second delayed comparison signal D_CS2 may be delayed from t2 to t3.

Accordingly, the top switching jitter $SWJ_t$ of the first delayed comparison signal D_CS1 and the bottom switching jitter $SWJ_b$ of the third delayed comparison signal D_CS3 may be reduced.

According to the above-described embodiments, although the top switching jitter and bottom switching jitter may increase in the process of reducing mid switching jitter to a smaller extent through the transmitter, the transceiver may compensate for the deterioration of each switching jitter through the receiver.

Figure 15:
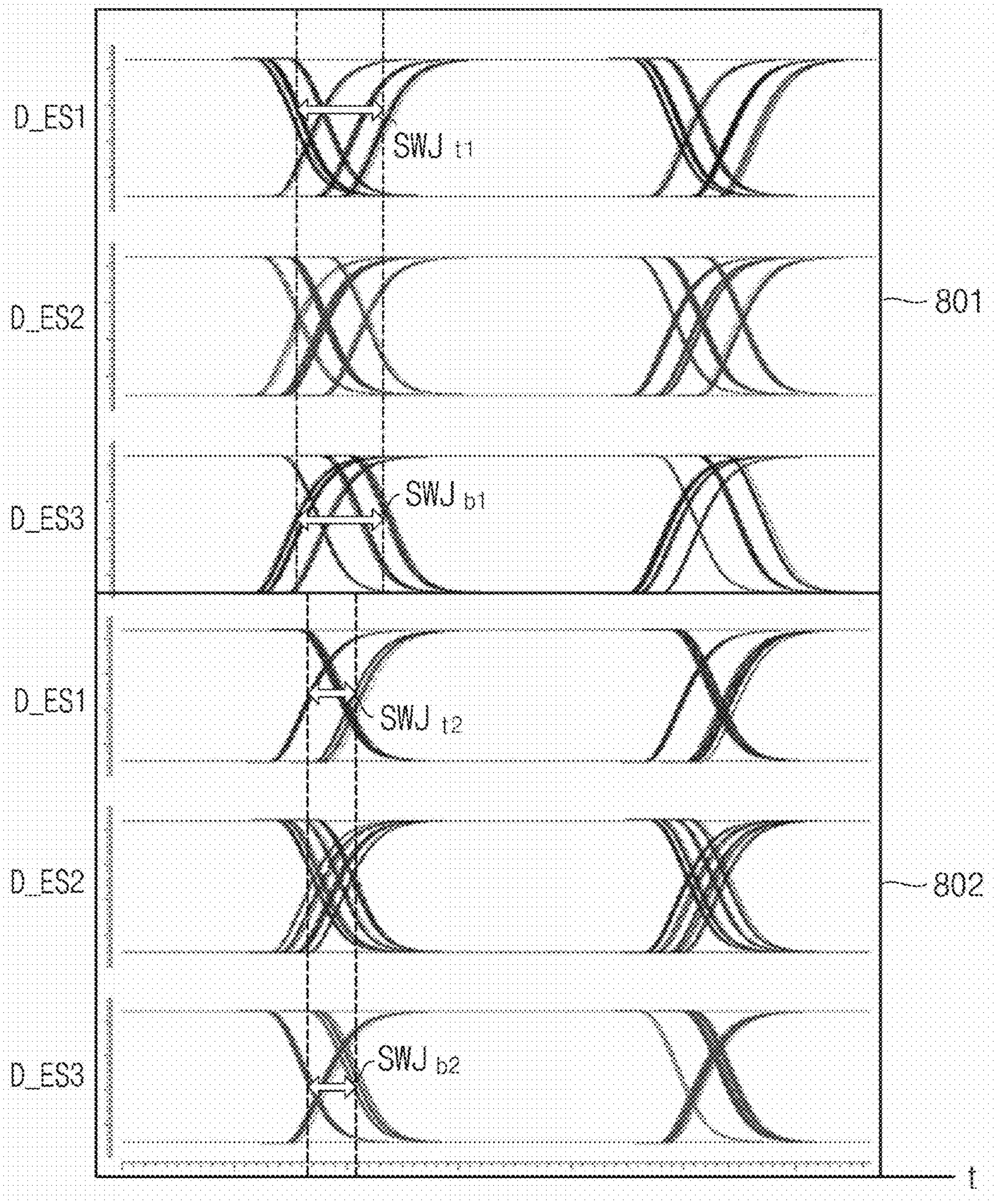
FIG. 15 illustrates a waveform of a delayed comparison signal of a transceiver according to an embodiment.

FIG. 15 illustrates a waveform of a delayed comparison signal of a transceiver according to an embodiment.

Referring to FIG. 15, it may be understood that all switching jitters are reduced in the delayed comparison signal in the case 802 in which the delay operation of the transceiver is performed compared to the case 801 in which there is no delay operation of the transceiver. It may be understood that in the first delayed comparison signal D_ES1 and the third delayed comparison signal D_ES3, the top and bottom switching jitters $SWJ_{t2}$ and $SWJ_{b2}$ are all reduced compared to the switching jitters $SWJ_{t1}$ and $SWJ_{b1}$ in the case of 801.

Figure 16:
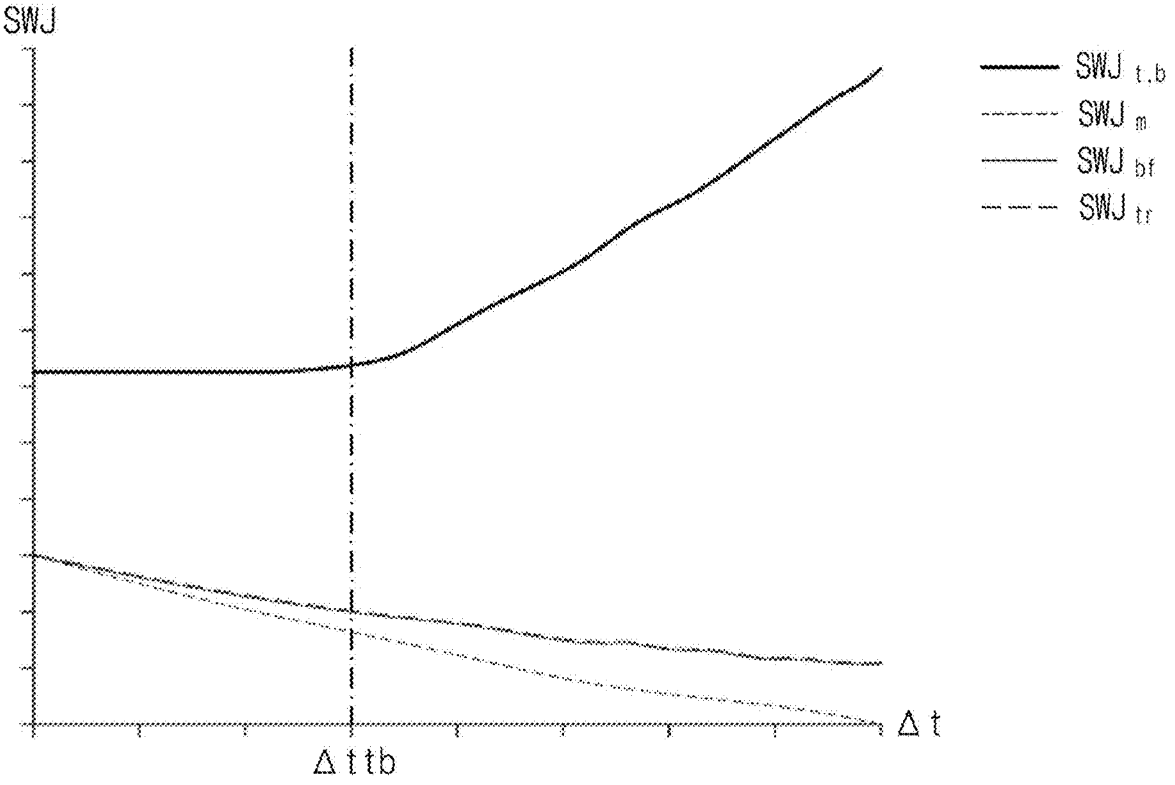
FIG. 16 illustrates switching jitter graph of an output signal of a transmitter according to an embodiment.

FIG. 16 illustrates switching jitter graph of an output signal of a transmitter according to an embodiment.

Referring to FIG. 16, as the adjustment timing value for the edge adjustment operation of the transmitter increases as described above, the mid switching jitter $SWJ_m$, top rising switching jitter $SWJ_{tr}$, and bottom falling switching jitter $SWJ_{bf}$ may be reduced (see FIG. 5). Conversely, the overall top switching jitter and bottom switching jitter $SWJ_{t,b}$ may actually deteriorate when the adjustment timing value exceeds a threshold adjustment timing value Δttb.

The transmitter according to an embodiment may adjust, through the edge adjustment circuit, the falling edge timing and the rising edge timing such that the (4-1)-th transition is located later in the eye diagram than the (3-1)-th transition, or adjust the falling edge timing and the rising edge timing such that the (1-4)-th transition is located later in the eye diagram than the (2-4)-th transition, thereby preventing the top switching jitter and bottom switching jitter $SWJ_{t,b}$ from deteriorating. For example, the adjustment timing value may be set below a threshold adjustment timing value Δttb.

Alternatively, the transmitter according to an embodiment may adjust the edge timing of the encoded signal at the risk of deteriorating the top switching jitter and bottom switching jitter $SWJ_{t,b}$ to further reduce the mid switching jitter $SWJ_m$. Nevertheless, by delaying the comparison signal by a predetermined time through the receiver, the degraded top switching jitter and bottom switching jitter $SWJ_{t,b}$ may be improved as much as the top rising switching jitter $SWJ_{tr}$ and bottom falling switching jitter $SWJ_{bf}$ reduced in the transmitter. Therefore, the deterioration of switching jitter may be compensated for in the finally decoded signal.

Specific embodiments have been described above. The present disclosure may encompass not only the above-described embodiments, but also design changes that may be made by one of ordinary skill in the art, as well as techniques that may modify and implement the embodiments. Therefore, the scope of the present disclosure should not be limited to the above-described embodiments, but should be defined by the appended claims and their equivalents.

What is claimed is:

1. A transmitter comprising:

an encoder configured to encode an input signal representable by x levels, where x is a natural number of 3 or more, and output a plurality of encoded signals forming a multi-bit binary number including a most significant bit and a least significant bit;

an edge adjustment circuit configured to generate a plurality of adjusted encoded signals by adjusting a falling edge timing of a first one of the encoded signals corresponding to the most significant bit, and adjusting a rising edge timing of a second one of the encoded signals corresponding to the least significant bit; and a driver circuit configured to generate and output an output signal having the x levels, based on the plurality of adjusted encoded signals.

2. The transmitter of claim 1, wherein the encoder is configured to encode the input signal in a thermometer code manner.

3. The transmitter of claim 1, wherein the falling edge timing includes transition times at which the plurality of encoded signals transition from a highest level among the x levels to remaining levels among the x levels, and the rising edge timing includes transition times at which the plurality of encoded signals transition from a lowest level among the x levels to remaining levels among the x levels.

4. The transmitter of claim 1, wherein the edge adjustment circuit is configured to adjust the falling edge timing and the rising edge timing by a same adjustment timing value.

5. The transmitter of claim 1, wherein the x levels include a highest level, a first intermediate level, a second intermediate level lower than the first intermediate level, and a lowest level.

6. The transmitter of claim 5, wherein the edge adjustment circuit is configured to adjust the falling edge timing and the rising edge timing such that a first intersection point between a (4-1)-th transition from the highest level to the lowest level and a (1-4)-th transition from the lowest level to the highest level is located later in an eye diagram representing a plurality of transitions in a time domain than a second intersection point between a (3-1)-th transition from the first intermediate level to the lowest level and a (2-4)-th transition from the second intermediate level to the highest level.

7. The transmitter of claim 6, wherein the edge adjustment circuit is configured to adjust the falling edge timing and the rising edge timing such that the (4-1)-th transition is located later in the time domain than the (3-1)-th transition.

8. The transmitter of claim 7, wherein the edge adjustment circuit is configured to adjust the falling edge timing and the rising edge timing such that the (1-4)-th transition occurs later than the (2-4)-th transition.

9. The transmitter of claim 1, wherein the multi-bit binary number represented by the plurality of encoded signals has a size of (x−1) bits.

10. The transmitter of claim 9, wherein the edge adjustment circuit includes (x−1) unit edge adjustment circuits.

11. The transmitter of claim 1, wherein the edge adjustment circuit includes:

a first unit edge adjustment circuit configured to receive the first one of the encoded signals corresponding to the most significant bit and adjust the falling edge timing;

a second unit edge adjustment circuit configured to adjust edge timing of a third one of the encoded signals corresponding to a middle bit of the multi-bit binary number; and a third unit edge adjustment circuit configured to receive the second one of the encoded signals corresponding to the least significant bit and adjust the rising edge timing.

12. The transmitter of claim 1, wherein the driver circuit includes:

a first driver configured to perform pull-up and pull-down operations according to a first adjusted encoded signal corresponding to the first one of the encoded signals corresponding to the most significant bit;

a second driver configured to perform pull-up and pull-down operations according to a second adjusted encoded signal corresponding to a third one of the encoded signals corresponding to a middle bit of the multi-bit binary number; and a third driver configured to perform pull-up and pull-down operations according to a third adjusted encoded signal corresponding to the second one of the encoded signals corresponding to the least significant bit.

13. A transmitter comprising:

an encoder configured to encode an input signal representable by x levels, where x is a natural number of 3 or more, and output a plurality of encoded signals representing a multi-bit binary number including a most significant bit, a middle bit, and a least significant bit;

an edge adjustment circuit configured to generate a plurality of adjusted encoded signals by adjusting a falling edge timing of a first one of the encoded signals corresponding to the most significant bit and a rising edge timing of a second one of the encoded signals corresponding to the least significant bit by a first adjustment timing value, and adjusting edge timing of a third one of the encoded signals corresponding to the middle bit by a second adjustment timing value different from the first adjustment timing value; and a driver circuit configured to generate and output an output signal having the x levels based on the plurality of adjusted encoded signals.

14. The transmitter of claim 13, wherein the falling edge timing includes transition times at which the plurality of encoded signals transition from a highest level among the x levels to remaining levels among the x levels, and the rising edge timing includes transition times at which the plurality of encoded signals transition from a lowest level among the x levels to remaining levels among the x levels.

15. The transmitter of claim 13, wherein the edge adjustment circuit is configured to adjust the falling edge timing and the rising edge timing by a same first adjustment timing value.

16. The transmitter of claim 13, wherein the edge adjustment circuit is configured to delay the edge timing by the second adjustment timing value.

17. A data communication system comprising:

a transmitter configured to output an output signal having x levels based on adjusting falling edge timing of an encoded signal corresponding to a most significant bit and rising edge timing of an encoded signal corresponding to a least significant bit among bits of a multi-bit binary number represented by a plurality of encoded signals encoded from an input signal represented by the x levels, where x is a natural number of 3 or more; and a receiver connected to the transmitter through a channel to receive the output signal and obtain the input signal from the output signal.

18. The data communication system of claim 17, wherein the transmitter includes:

an encoder configured to encode the input signal to generate the plurality of encoded signals;

an edge adjustment circuit configured to adjust the falling edge timing of the encoded signal corresponding to the most significant bit and the rising edge timing of the encoded signal corresponding to the least significant bit; and a driver circuit configured to output the output signal.

19. The data communication system of claim 17, wherein the transmitter is configured to adjust the falling edge timing of the encoded signal corresponding to the most significant bit and the rising edge timing of the encoded signal corresponding to the least significant bit by a same adjustment timing value.

20. The data communication system of claim 17, wherein the receiver includes:

a comparison circuit configured to output a plurality of comparison signals each having two signal levels, based on comparing the output signal with a plurality of reference signals;

an edge delay circuit configured to output a plurality of delayed comparison signals by delaying falling edge timing of a comparison signal corresponding to the most significant bit and rising edge timing of a comparison signal corresponding to the least significant bit among the plurality of comparison signals; and a decoder configured to obtain the input signal by decoding the plurality of delayed comparison signals.

* * * * *